(12) United States Patent
Kim et al.

(10) Patent No.: US 12,092,475 B2
(45) Date of Patent: Sep. 17, 2024

(54) MOBILE APPARATUS AND VEHICLE

(71) Applicants: Hyundai Motor Company, Seoul (KR); Kia Corporation, Seoul (KR)

(72) Inventors: Soobin Kim, Seoul (KR); Jae Yul Woo, Seoul (KR); Seunghyun Woo, Seoul (KR); Rowoon An, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 298 days.

(21) Appl. No.: 17/677,765

(22) Filed: Feb. 22, 2022

(65) Prior Publication Data

US 2022/0381578 A1 Dec. 1, 2022

(30) Foreign Application Priority Data

May 27, 2021 (KR) ........................ 10-2021-0068280

(51) Int. Cl.
*G01C 21/36* (2006.01)
*G06T 7/73* (2017.01)
(Continued)

(52) U.S. Cl.
CPC ..... *G01C 21/3647* (2013.01); *G01C 21/3602* (2013.01); *G01C 21/367* (2013.01);
(Continued)

(58) Field of Classification Search
CPC ............ G01C 21/3647; G01C 21/3602; G01C 21/367; G01C 21/3691; G01C 21/20;
(Continued)

(56) References Cited

U.S. PATENT DOCUMENTS

2020/0184686 A1* 6/2020 Jung .................. G01C 21/3658
2020/0200549 A1* 6/2020 Lindemann ........ G01C 21/3655

FOREIGN PATENT DOCUMENTS

JP   H 09152349 A   6/1997
JP   2013-231655 A   11/2013
(Continued)

OTHER PUBLICATIONS

Machine Translation of KR-20080027659 (Year: 2008).*

*Primary Examiner* — Alan D Hutchinson
(74) *Attorney, Agent, or Firm* — MORGAN, LEWIS & BOCKIUS LLP

(57) ABSTRACT

A mobile apparatus performing an augmented reality function and a navigation function includes an input device, a location receiver for obtaining a current location, an image obtaining device, a display device provided to display surrounding image obtained from the image obtaining device in response to execution of an augmented reality mode, and a controller provided to search for a route from the current location to a destination, destination information and map information obtained by the location receiver, identify a moving situation according to route information corresponding to the searched route, obtain location information of an inflection point at which the moving situation is changed according to information on the identified moving situation, and control the display device to display an object image of the inflection point on the surrounding image displayed on the display device based on the location information of the inflection point and the current location information.

20 Claims, 15 Drawing Sheets

(51) Int. Cl.
  *G06T 11/00*   (2006.01)
  *G06V 20/20*   (2022.01)
  *G06V 20/56*   (2022.01)
  *G08G 1/0968*  (2006.01)
  *H04W 4/024*   (2018.01)

(52) U.S. Cl.
  CPC ............ *G01C 21/3691* (2013.01); *G06T 7/74* (2017.01); *G06T 11/00* (2013.01); *G06V 20/20* (2022.01); *G06V 20/56* (2022.01); *G08G 1/096844* (2013.01); *G08G 1/096861* (2013.01); *G08G 1/096883* (2013.01); *H04W 4/024* (2018.02)

(58) Field of Classification Search
  CPC ............ G01C 21/3492; G01C 21/3605; G01C 21/3638; G06T 7/74; G06T 11/00; G06T 19/003; G06T 19/006; G06T 19/20; G06V 20/20; G06V 20/56; G08G 1/096844; G08G 1/096861; G08G 1/096883; G08G 1/096827; G08G 1/09685; G08G 1/096866; G08G 1/0969; H04W 4/024; H04W 4/80; H04W 4/029; G06F 16/9537; G06F 16/538; G06F 16/587; G06F 16/9538; G06Q 50/40
  See application file for complete search history.

(56) References Cited

FOREIGN PATENT DOCUMENTS

| | | | |
|---|---|---|---|
| JP | 2015-068831 | A | 4/2015 |
| JP | 2020-196417 | A | 12/2020 |
| JP | 2021-028587 | A | 2/2021 |
| JP | 6828934 | B1 | 2/2021 |
| KR | 20080027659 | A * | 3/2008 |
| KR | 10-2020-0071071 | A | 6/2020 |

* cited by examiner

MOBILE APPARATUS AND VEHICLE

CROSS-REFERENCE TO RELATED APPLICATION(S)

The present application claims priority to Korean Patent Application No. 10-2021-0068280, filed on May 27, 2021, the entire contents of which is incorporated herein for all purposes by this reference.

BACKGROUND OF THE INVENTION

Field of the Invention

The present invention relates to a mobile apparatus and a vehicle with a navigation function of guiding routes to a destination.

Description of Related Art

With the recent development of digital technology, various types of mobile apparatuses, such as a mobile communication terminal, a smart phone, a tablet Personal computer (PC), a notebook, a Personal Digital Assistant (PDA), a wearable device, a digital camera, and a personal computer, are widely used.

Recently, research and development on a navigation function in addition to a call function, a multimedia playback function (e.g., music playback and video playback), and an Internet function among functions which may be performed in a mobile apparatus are increasing.

The navigation function here is a function that is also performed in vehicles, and a mobile apparatus or vehicle generally utilizes a global positioning system (GPS) to recognize a current location when the navigation function is performed.

Such a Global Positioning System (GPS) may not accurately recognize a current location due to a communication failure with a satellite indoors, underground, or in an area where there are many tall buildings, and may have a very large error range between an actual current location and a recognized current location.

Furthermore, when the mobile apparatus or vehicle performs the navigation function, the mobile apparatus or vehicle may not accurately guide a user to a destination until the user arrives at the destination due to the termination of the navigation function at a location adjacent to the destination.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a mobile apparatus and a vehicle configured for guiding routes to a destination while controlling display of an object image in an augmented reality function during performing a navigation mode and an augmented reality mode, and displaying a congestion section and an accident section and suggesting an alternative route during guiding the routes to the destination.

Various aspects of the present invention are directed to providing a mobile apparatus and a vehicle configured for displaying a point of interest (POI), such as a destination, with emphasis or displaying the point of interest (POI) with adjustment of transparency, using an object image.

Additional aspects of the present invention will be set forth in part in the description which follows, and in part, will be obvious from the description, or may be learned by practice of the present invention.

In accordance with an aspect of the present invention, a mobile apparatus includes an input device configured to receive a user input, a location receiver configured to receive location information for obtaining a current location, an image obtaining device configured to obtain an image of a surrounding environment, a display device configured to display the surrounding image obtained from the image obtaining device in response to execution of an augmented reality mode, and a controller configured to search for a route from the current location to a destination when destination information is received from the user input during the execution of the augmented reality mode, identify a moving situation according to route information corresponding to the searched route, obtain location information of an inflection point at which the moving situation is changed according to information on the identified moving situation, and control the display device to display an object image of the inflection point on the surrounding image displayed on the display device according to the location information of the inflection point and current location information.

The controller of the mobile apparatus may obtain distance information from the current location to the inflection point according to the current location information and the location information of the inflection point, and change display information of the object image of the inflection point according to the obtained distance information, and the display information of the object image of the inflection point may include at least one of shape information and color information.

The controller of the mobile apparatus may, when the controller concludes that a distance to the inflection point is greater than or equal to a first reference distance, identify a direction of the destination according to the current location information, the destination information, and map information, and control the display device to display an object image oriented from the current location to the direction of the destination on the surrounding image displayed on the display device.

The controller of the mobile apparatus may, when the controller concludes that a distance to the inflection point is less than a first reference distance and greater than or equal to a second reference distance, control the display device to display an object image of a long-distance inflection point on the surrounding image based on a location of the inflection point and map information. The first reference distance may be longer than the second reference distance.

The controller of the mobile apparatus may change the second reference distance to a third reference distance when the controller concludes that there is a plurality of the inflection points within a preset distance according to the route information.

The controller of the mobile apparatus may, according to the information on the identified moving situation, control the display device to display the object image of the long-distance inflection point in a first color when the moving situation is a smooth situation, to display the object image of the long-distance inflection point in a second color when the controller concludes that the moving situation is a congestion situation or an accident situation, and to display the object image of the long-distance inflection point in a third color when the controller concludes that the moving situation is a route change situation.

The controller of the mobile apparatus may, when traffic information is received by the controller, determine whether a route change is necessary according to the received traffic information, the destination information, the current location information, the route information, and the map information.

The controller of the mobile apparatus may, when the controller concludes that the distance to the inflection point is less than the second reference distance, control the display device to display an object image of a short-distance inflection point on the surrounding image based on the location of the inflection point and the map information.

The controller of the mobile apparatus may, according to the information on the identified moving situation, control the display device to display the object image of the short-distance inflection point in a first color when the controller concludes that the moving situation is a route maintenance situation, to display the object image of the short-distance inflection point in a second color when the controller concludes that the moving situation is a congestion situation or an accident situation, and to display the object image of the short-distance inflection point in a third color when the controller concludes that the moving situation is a route change situation.

The controller of the mobile apparatus may control the display device to display traffic information when the controller concludes that a display position of the oriented object image coincides with a display position of the object image of the short-distance inflection point and does not coincide with a display position of the object image of the long-distance inflection point.

The controller of the mobile apparatus may control the display device to display traffic information and alternative route information when the controller concludes that a display position of the oriented object image does not coincide with a display position of the object image of the short-distance inflection point and does not coincide with a display position of the object image of the long-distance inflection point.

The controller of the mobile apparatus may determine whether a distance to the destination is less than or equal to a predetermined distance according to the destination information, the current location information, the route information, and map information, recognize a destination image corresponding to the destination information from the surrounding image when the controller concludes that the distance to the destination is less than or equal to the predetermined distance, and control the display device to overlap and display an emphasized object image on the recognized destination image.

The controller of the mobile apparatus may determine whether a distance to the destination is less than or equal to the predetermined distance according to the destination information, the current location information, the route information, and the map information, recognize the destination image corresponding to the destination information from the surrounding image when the controller concludes that the distance to the destination is less than or equal to the predetermined distance, and control transparency of the recognized destination image and remaining images to be different from each other.

The controller of the mobile apparatus may recognize a ground image adjacent to the destination image from the surrounding image, control the display device to display a grid-shaped object image on the recognized ground image, and control the display device to overlap and display an anchoring mark image on the destination image.

In accordance with another aspect of the present invention, a vehicle includes an input device configured to receive a user input, a location receiver configured to receive location information for obtaining a current location, a speed detector configured to detect a driving speed, an image obtaining device configured to obtain an image of a surrounding environment, a display device configured to display the surrounding image obtained from the image obtaining device in response to execution of an augmented reality mode, and a controller configured to search for a route from the current location to a destination when destination information is received by the controller from the user input during interworking of the augmented reality mode and a navigation mode, identify a moving situation according to route information corresponding to the searched route and driving speed information detected by the speed detector, obtain location information of an inflection point at which the moving situation is changed according to information on the identified moving situation, and control the display device to display an object image of the inflection point on the surrounding image displayed on the display device according to the location information of the inflection point and current location information.

The controller of the vehicle may obtain distance information from the current location to the inflection point according to the current location information and the location information of the inflection point, and change display information of the object image of the inflection point according to the obtained distance information. The display information of the object image of the inflection point may include at least one of shape information and color information.

The controller of the vehicle may, when the controller concludes that a distance to the inflection point is greater than or equal to a first reference distance, identify a direction of the destination based on the current location information, destination information, and map information and control the display device to display an object image oriented from the current location to the direction of the destination on the surrounding image displayed on the display device, when the controller concludes that the distance to the inflection point is less than a first reference distance and greater than or equal to a second reference distance, control the display device to display an object image of a long-distance inflection point on the surrounding image based on a location of the inflection point and the map information, and when the controller concludes that the distance to the inflection point is less than the second reference distance, control the display device to display an object image of a short-distance inflection point on the surrounding image based on the location of the inflection point and the map information. The first reference distance may be longer than the second reference distance.

The controller of the vehicle may control the display device to display traffic information when the controller concludes that a display position of the oriented object image coincides with a display position of the object image of the short-distance inflection point and does not coincide with a display position of the object image of the long-distance inflection point, and control the display device to display the traffic information and alternative route information when the controller concludes that the display position of the oriented object image does not coincide with the display position of the object image of the short-distance inflection point and does not coincide with the display position of the object image of the long-distance inflection point.

The controller of the vehicle may, when traffic information is received by the controller, determine whether a route change is necessary based on the received traffic information, the destination information, the current location information, the route information, and map information, and recognize a point at which the route is changed as an inflection point when the controller concludes that the route change is necessary.

The controller of the vehicle may determine whether a distance to the destination is less than or equal to a predetermined distance according to the destination information, the current location information, the route information, the driving speed information, and map information, recognize a destination image corresponding to the destination information from the surrounding image when the controller concludes that the distance to the destination is less than or equal to the predetermined distance, and control the display device to overlap and display an emphasized object image on the recognized destination image.

The controller of the vehicle may, when searching for the route from the current location to the destination, search for the route from the current location to the destination according to the current location information, the destination information and map information obtained by the location receiver, and when controlling the display device to display the object image of the inflection point on the surrounding image displayed on the display device, control the display device to display the object image of the inflection point on the surrounding image displayed on the display device according to the location information of the inflection point, the map information, and the current location information.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
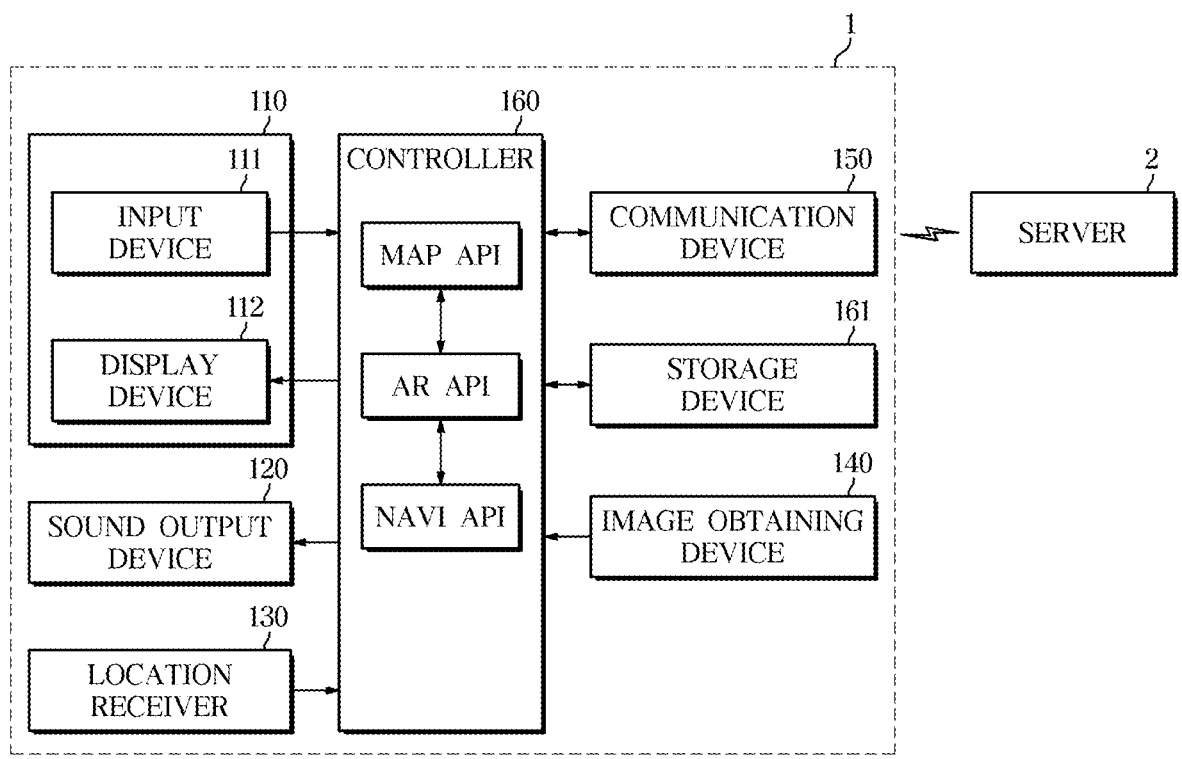
FIG. 1 is a control schematic diagram of a mobile apparatus according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Throughout the specification, like reference numerals refer to like elements. The present specification does not describe all the elements of the embodiments, and duplicative contents between general contents or embodiments in the technical field of the invention will be omitted. The terms 'part,' 'module,' 'member,' and 'block' used in the exemplary embodiment may be embodied as software or hardware, and it is also possible for a plurality of 'units,' 'modules,' 'members,' and 'blocks' to be embodied as one component, or one 'unit,' 'module,' 'member,' and 'block' to include a plurality of components according to exemplary embodiments.

Throughout the specification, when a part is referred to as being "connected" to another part, it includes not only a direct connection but also an indirect connection, and the indirect connection includes connecting through a wireless network.

Furthermore, when it is described that a part "includes" an element, it means that the element may further include other elements, not excluding the other elements unless specifically stated otherwise.

The terms 'first,' 'second,' etc. are used to distinguish one element from another element, and the elements are not limited by the above-mentioned terms.

The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

Hereinafter, the present invention will be described in detail with reference to the accompanying drawings.

FIG. 1 is a control block diagram of a mobile apparatus according to various exemplary embodiments of the present invention, which will be described with reference to FIG. 2, FIG. 3, FIG. 4, FIG. 5, FIG. 6, FIG. 7, FIG. 8, FIG. 9, FIG. 10, and FIG. 11.

A mobile apparatus 1 may be a terminal that a user may carry.

The mobile apparatus 1 may be a terminal which may be detachably mounted on a vehicle, or a terminal which may be embedded in a dashboard of the vehicle. The mobile apparatus 1 may be an AVN (Audio Video Navigation) terminal that performs audio, video, and navigation functions in the vehicle.

The mobile apparatus 1 may be implemented as a computer or a portable terminal configured for accessing the vehicle through a network.

Herein, the computer may include, for example, a notebook, a desktop, a laptop, a tablet PC, a slate PC, and the like, on which a WEB Browser is installed, and the portable terminal, which is a wireless communication device that ensures portability and mobility, may include all kinds of handheld based wireless communication devices, for example, such as a PCS (Personal Communication System), a Global System for Mobile communications (GSM), a Personal Digital Cellular (PDC), a Personal Handyphone System (PHS), a Personal Digital Assistant (PDA) Personal digital assistant (PDA), an International Mobile Telecommunication (IMT)-2000, a Code Division Multiple Access (CDMA)-2000, an W-Code Division Multiple Access (W-CDMA), a Wireless Broadband Internet (WiBro) terminal, and a smart phone, and a wearable device such as a watch, a ring, a bracelet, an anklet, a necklace, a pair of glasses, a contact lens, and a head-mounted-device (HMD).

The mobile apparatus 1 includes a user interface 110, a sound output device 120, a location receiver 130, an image obtaining device 140, a communication device 150, a controller 160, and a storage device 161.

The user interface 110 receives a user input and outputs various pieces of information so that the user may recognize. The user interface 110 may include an input device 111 and a display device 112.

The input device 111 receives the user input.

The input device 111 may receive a lock command, a lock release command, a power-on command, and a power-off command of the mobile apparatus 1, and may receive an image display command of the display device 112.

The input device 111 may receive operation commands for various functions executable by the mobile apparatus 1 and may receive setting values of various functions.

When the mobile apparatus 1 is provided in a vehicle, the input device 111 may receive operation commands for various functions to be performed in the vehicle.

For example, the functions to be performed in the mobile apparatus 1 may include a call function, a text function, an audio function, a video function, a navigation function, a map function, a broadcast playback function, a radio function, a content playback function, an Internet search function, and an augmented reality function, and may include a function of executing at least one application installed in the mobile apparatus 1.

The augmented reality (AR) function is a technology that shows by synthesizing virtual related information (e.g., text, images, etc.) with real objects (e.g., real environments). Unlike a virtual reality (VR) function, which targets only virtual spaces and objects, the augmented reality function provides a user with additional information which is difficult to obtain only in a real environment by providing a virtual related object to an object which is the real environment.

At least one application installed in the mobile apparatus 1 may be an application for providing at least one service to the user. Herein, the service may be to provide information for safety, convenience, and fun of the user.

The input device 111 may receive an execution command of a navigation application (NAVI API) for performing the navigation function, may receive an execution command of an augmented reality application (AR API) for performing the augmented reality function, and may receive an execution command of a map application (MAP API) for performing the map function.

The input device 111 may receive destination information in response to the execution of the navigation function, and may receive route selection information for selecting any one route among a plurality of routes.

The input device 111 may receive the destination information during the execution of the augmented reality function or the map function.

The input device 111 may receive point of interest (POI) information on a point of interest (POI) during the execution of the augmented reality function.

The input device 111 may be implemented as a jog dial or a touch pad for inputting a cursor movement command and an icon or button selection command displayed on the display device 112.

The input device 111 may include a hardware device such as various buttons or switches, a pedal, a keyboard, a mouse, a track-ball, various levers, a handle, and a stick.

Also, the input device 111 may include a graphical user interface (GUI) such as a touch panel, that is, a software device. The touch panel may be implemented as a touch screen panel (TSP) to form a layer structure with the display device 112.

The display device 112 may display execution information on at least one function performed in the mobile apparatus 1 in response to a control command of the controller 160 as an image, and may display information corresponding to the user input received by the input device 112 as an image.

Figure 2:
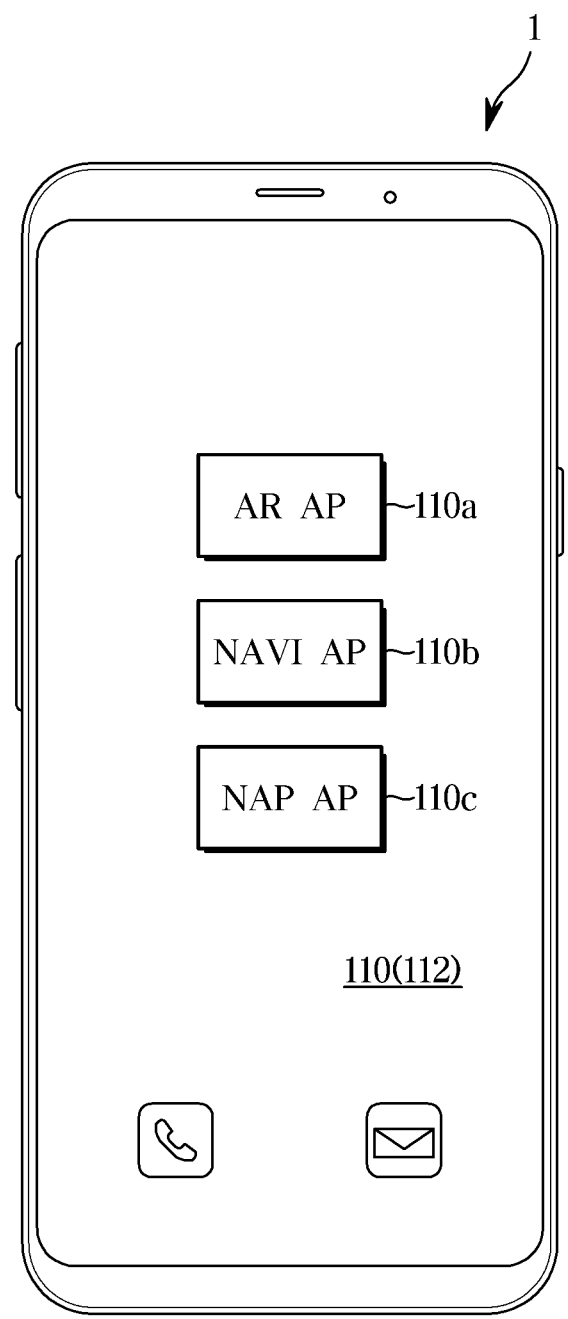
FIG. 2 and FIG. 3 are exemplary display views of a display device of the mobile apparatus according to various exemplary embodiments of the present invention.

The display device 112 may display an icon of an application for a function which may be performed in the mobile apparatus 1. For example, as illustrated in FIG. 2, the display device 112 may display an icon 110*a* of the augmented reality application, an icon 110*b* of the navigation application, and an icon 110*c* of the map display application.

The display device 112 may display map information, the destination information, and route guidance information during the execution of the navigation function, and may display current location information on a current location. That is, the display device 112 may display a navigation image in which the route guidance image to a destination in the map image is matched with a current location image indicating the current location when the navigation function is executed.

Figure 3:
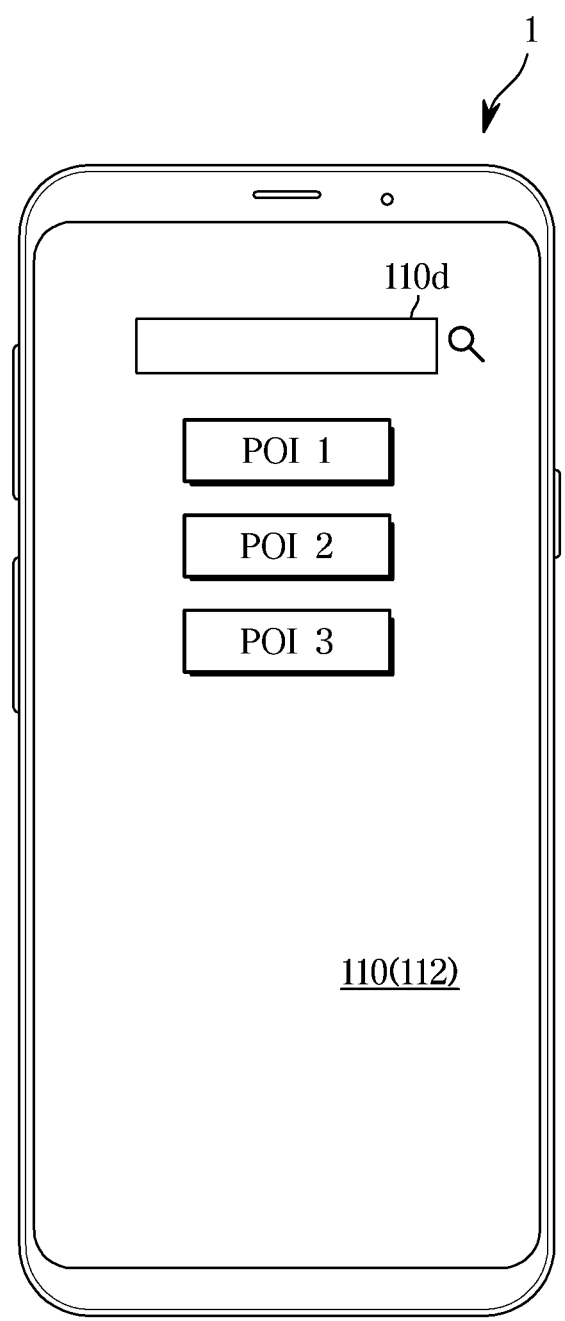

As illustrated in FIG. 3, the display device 112 may display a search window 110*d* for searching for the POI in response to the user input during the execution of the augmented reality function, and may display icons of pre-stored points of interest (POIs). The display device 112 may display information on a previously searched or stored POI in a form of a button.

The display device 112 may display the object image of an inflection point at a display position of the inflection point where a change in moving situation may occur while displaying the image obtained by the image obtaining device 140 during the execution of the augmented reality function.

The object image of the inflection point may include a short-distance inflection point image and a long-distance inflection point image. Also, the object image of the inflection point may include a dotted line image, a dot image, and an arrow image.

For example, when the distance to the inflection point is long, the display device 112 may enable the user to easily recognize a direction of the destination by displaying the object image of the inflection point directing to the direction of the destination based on the current location. Herein, the object image of the inflection point directing to the direction of the destination may be a point-shaped straight line (hereinafter, referred to as a dotted line) image as an oriented object image.

The display device 112 may display by overlapping the object image in a destination image corresponding to the destination. The object image overlapped in the destination image, which is an emphasis image for emphasizing the destination image, may be an emphasis object image.

Figure 4A:
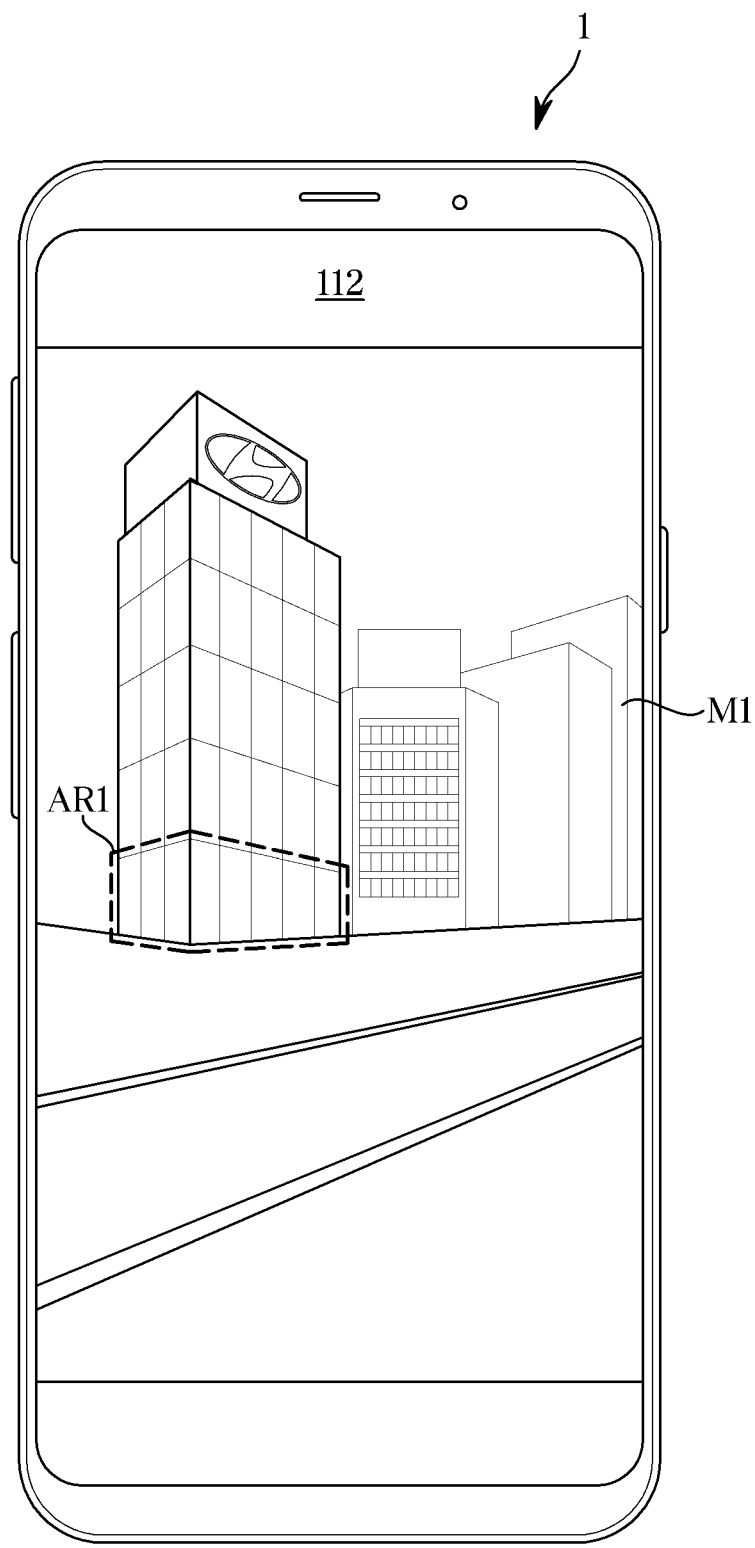
FIG. 4A, FIG. 4B, FIG. 5, FIG. 6, FIG. 7A, FIG. 7B, FIG. 8, FIG. 9, FIG. 10, and FIG. 11 are exemplary display views of an object image of an augmented reality function of the mobile apparatus according to various exemplary embodiments of the present invention.

For example, as illustrated in FIG. 4A, the display device 112 may enable the user to easily recognize the destination by displaying an emphasized object image AR1 indicating the destination on the destination image (e.g., a building imager corresponding to the destination.

The display device 112 may display the emphasized object image AR1 to appear to the user as if it is moving by reciprocating and displaying the emphasized object image (AR1) indicating the destination at regular intervals or repeating display and non-display of the highlighted object image AR1 indicating the destination at regular time intervals.

The display device 112 may display an image m1 other than the destination image blurrier than the destination image.

Figure 4B:
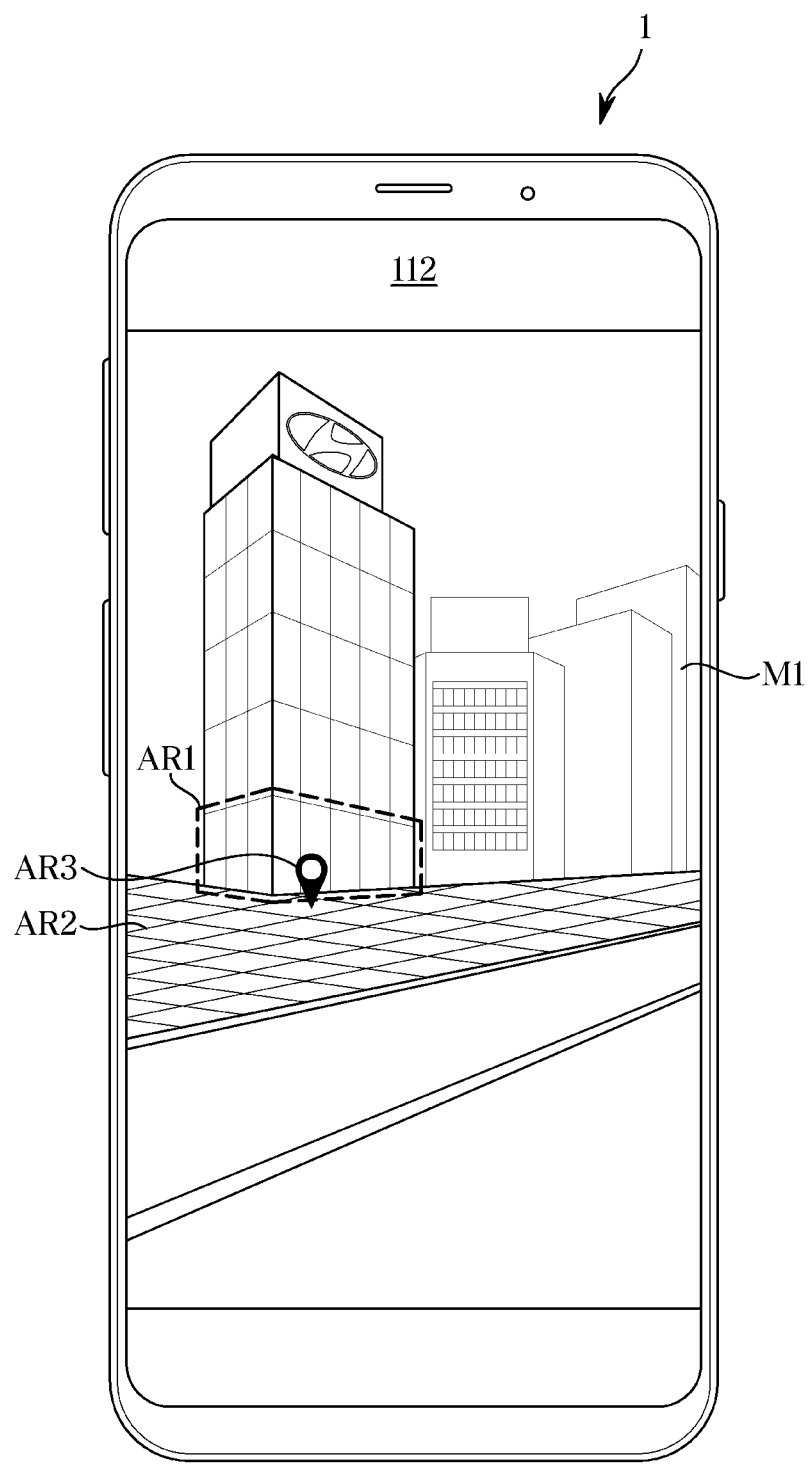

As illustrated in FIG. 4B, the display device 112 may display the destination precisely and accurately by displaying a first emphasized object image AR1 on the destination image corresponding to the destination during the execution of the augmented reality function, displaying a second emphasized object image AR2 that guides the destination on a ground image adjacent to the destination image, and displaying a third emphasized object image AR3 emphasizing that it is the destination together.

The first emphasized object image AR1 indicating the destination may be a polygonal image formed of dotted lines.

The second emphasized object image AR2 for guiding the destination may be a grid image through plane detection. Herein, the plane detection is to detect a plane when an object image of augmented reality (AR) is needed to be displayed on a vertical plane.

The third emphasized object image AR3 emphasizing that it is the destination, which is an anchoring mark image, may enable the user to grasp a precise position of an anchoring value.

The display device 112 may display the destination image corresponding to the destination with emphasis, and may display the remaining image m1 other than the destination image blurrier than the destination image by a dimming processing.

Figure 5:
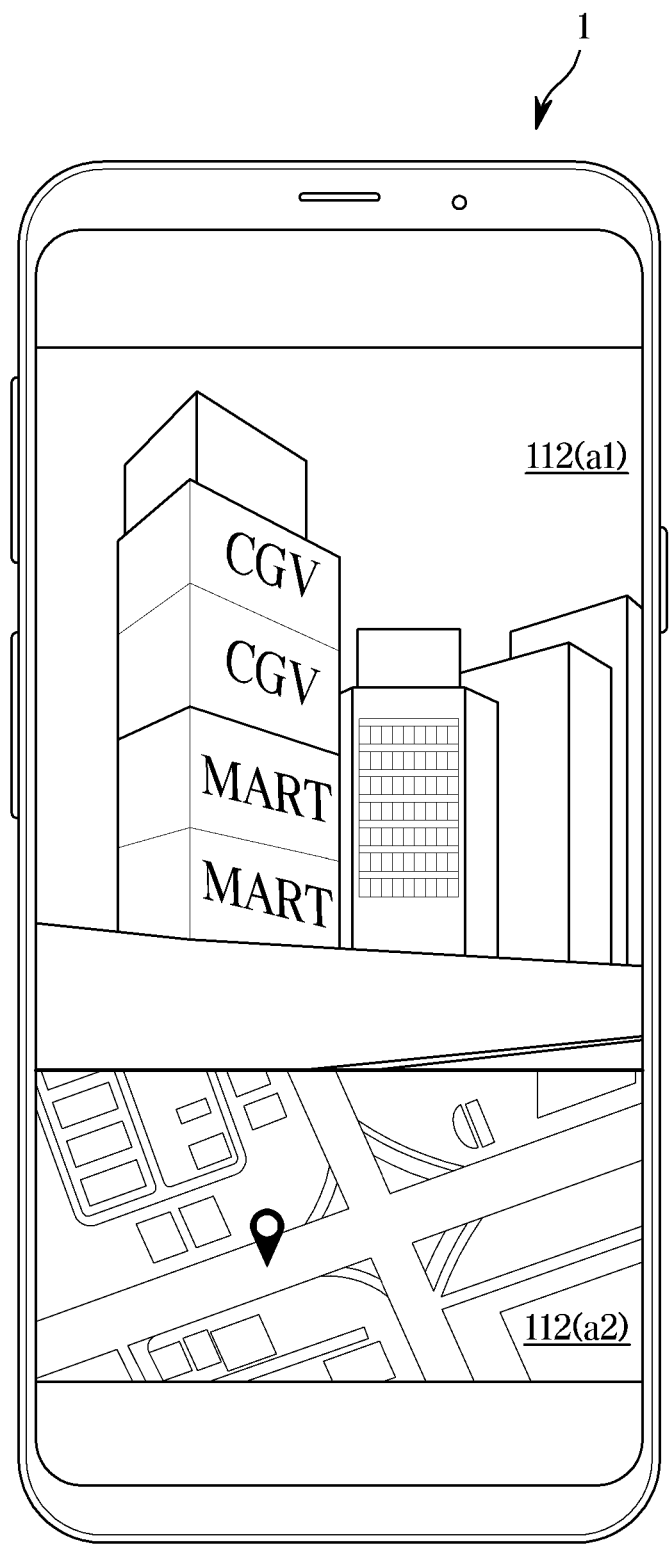

As illustrated in FIG. 5, the display device 112 may simultaneously display the navigation image and the augmented reality image while displaying the navigation image and the augmented reality image in different display regions of the display device 112.

That is, the display device 112 may display the augmented reality image in a first display region a1 and display the navigation image in a second display region a2.

The display device 112 may include a cathode ray tube (CRT), a digital light processing (DLP) panel, a plasma display panel, a liquid crystal display (LCD) panel, an electro luminescence (EL) panel, an electrophoretic display (EPD) panel, an electrochromic display (ECD) panel, a light emitting diode (LED) panel or an organic light emitting diode (OLED) panel, but is not limited thereto.

The mobile apparatus 1 may further include a sound receiver for receiving a voice of the user. In the instant case, the controller 160 may perform a voice recognition function and may recognize the user input through the voice recognition function.

The sound receiver may include a microphone that converts sound waves into electrical signals. One or two or more of the microphones may be provided, and the one microphone may be directional.

The two or more microphones may be implemented as a microphone array.

The sound output device 120 may output a sound for a function being performed by the mobile apparatus 1. The sound output device 120 may include at least one or a plurality of speakers.

For example, the sound output device 120 may output the route guidance information as a sound while the navigation function is being performed.

The speaker converts an amplified low-frequency audio signal into an original sound wave, generates a small wave in the air, and copies the sound wave, outputting audio data as sound that the user may hear.

The location receiver 130 receives a signal for obtaining the current location information on the current location of the mobile apparatus 1.

The location receiver 130 may be a global positioning system (GPS) receiver that communicates with a plurality of GPS satellites. The GPS receiver includes an antenna module for receiving signals from the plurality of GPS satellites, and may include software for obtaining a current location by use of distance and time information corresponding to position signals of the plurality of GPS satellites, and an output device configured for outputting the obtained vehicle location information.

The location receiver 130 may include a visual positioning service (VPS).

The image obtaining device 140 obtains an image around the mobile apparatus 1 and transmits image information on the obtained image to the controller 160. The image information may be image data.

The image obtaining device 140 has a view of the front of the mobile apparatus 1.

The image obtaining device 140 may include at least one or a plurality of cameras for obtaining external images in forward and rearward directions of the mobile apparatus 1.

Assuming that a display surface of the display device of the mobile apparatus 1 is a front surface of a body of the mobile apparatus, the at least one camera may be disposed on the front surface of the body of the mobile apparatus, and the other camera may be disposed on a rear surface of the body of the mobile apparatus. The rear surface may be a surface directing in a direction opposite to the direction of the front surface with respect to the body.

The image obtaining device 140 may include a CCD or CMOS image sensor as a camera, and may also include a three-dimensional spatial recognition sensor such as a KINECT (RGB-D sensor), a TOF (structured light sensor), and a stereo camera.

The communication device 150 may receive at least one application from an external server 2 and may receive update information on the installed application.

The communication device 150 may receive the number of visits of users to at least one of the multi-use facilities from the external server 2.

The communication device 150 may include one or more components that enable communication between internal components, and may include, for example, at least one of a short-range communication module, a wired communication module, and a wireless communication module.

The short-range communication module may include various short-range communication modules that transmit and receive signals using a wireless communication network in a short distance such as a Bluetooth module, an infrared communication module, a Radio Frequency Identification (RFID) communication module, an Near Field Communication (NFC) module, and a Zigbee communication module.

The wired communication module may include various wired communication modules such as a Controller Area Network (CAN) communication module, a Local Area Network (LAN) module, a WAN (Wide Area Network (WAN) module, and a Value Added Network (VAN) module, as well as various cable communication modules such as a Universal Serial Bus (USB), an High Definition Multimedia Interface (HDMI), a Digital Visual Interface (DVI), an Recommended Standard 232 (RS-232), power line communication, and a Plain old telephone service (POTS).

The wired communication module may further include a local Interconnect network (LIN).

The wireless communication module, in addition to a Wi-Fi module and a wireless broadband module, may include wireless communication modules supporting various wireless communication methods such as a Global System for Mobile Communication (GSM), a Code Division Multiple Access (CDMA), a Wideband Code Division Multiple Access (WCDMA), a Universal Mobile Telecommunications System (UMTS), a Time Division Multiple Access (TDMA), Long Term Evolution (LTE), and an Ultra WideBand (UWB) module.

The controller 160 controls image display of the display device 112 based on at least one of the lock release command, the power-on command, and the image display command of the mobile apparatus 1 received in at least one of the input device 111, the image obtaining device 140, and the sound receiver.

The controller 160 may control the display of the execution image of the augmented reality function when the execution command of the augmented reality application is received by the input device 111, may control the execution of the navigation application so that the navigation application is activated, and may also control the execution of the map application so that the map application is activated.

When a selection signal of an execution button of the augmented reality application is received, the controller 160 may determine that the execution command of the augmented reality application has been received. The execution button of the augmented reality application may be a physical button.

When touch location information received by the input device 111 corresponds to display location information of the icon of the augmented reality application, the controller 160 may determine that the execution command of the augmented reality application has been received.

The controller 160 may control activation of the image obtaining device 140 when the execution command of the augmented reality application is received by the input device 111, and may control activation of the location receiver 130.

The controller 160 may perform image processing on the image obtained by the image obtaining device 140 and control the display of the image-processed image when the image obtaining device 140 is activated during the execution of the augmented reality application, and may obtain the current location information of the mobile apparatus 1 based on the location information output from the location receiver 130 when the location receiver 130 is activated.

When the execution command of the navigation application is received by the input device 111, the controller 160 may obtain the map information stored in the storage device and control the activation of the location receiver 130.

When a plurality of the navigation applications is provided, the controller 160 may perform interworking with the preset navigation application or the navigation application selected by the user during the execution of the augmented reality function.

When a plurality of the navigation applications is provided, the controller 160 may receive a selection signal of the navigation application for driving a vehicle or receive a selection signal of the navigation application for walking of the user.

The controller 160 may transmit the POI information, the destination information, the current location information, and information on a plurality of routes, which are stored in the navigation application, to the augmented reality application in conjunction with the navigation function dud ng the execution of the augmented reality function.

The controller 160 may identify the destination information input by the input device 111 during the execution of the navigation function, identify the current location information received in the location receiver 130, search for a route from the current location to the destination based on the identified current location information and destination information, obtain the route guidance information on the searched route, control the display device 112 to display the navigation image in which the map information, the current location information, the destination information, and route information are matched, and control at least one of the display device 112 and the sound output device 120 to output the route guidance information based on the current location information. The current location information may be changed in real time in response to the movement of the mobile apparatus 1.

The controller 160 may also set the information of the point of interest received through the input device 111 as the destination information.

When a plurality of routes is searched, the controller 160 may control display device 112 to display the route information on the plurality of routes.

The controller 160 may control the display device 112 to display detailed information on each of the plurality of routes. The detailed information may include an arrival time, a moving distance, traffic information, and the like.

When any one of the plurality of routes is selected by the input device 11 the controller 160 may control to display route information on the selected route.

When a route guidance command is received during interworking of the navigation function and the augmented reality function, the controller 160 may control the operation of at least one of the display device 112 and the sound output device 120 to output the route information and the route guidance information while displaying the navigation image.

Hereinafter, the display control configuration of the controller 160 during the interworking of the augmented reality function and the navigation function will be described.

The controller 160 may control the display device 112 to simultaneously display the navigation image and the augmented reality image during the interworking of the augmented reality function and the navigation function while dividing an area of the display device 112 into at least two regions and controlling the display device 112 to display the navigation image and the augmented reality image in the divided regions, respectively.

The controller 160 identifies a moving situation of the mobile apparatus 1 based on at least one of route information from the current location to the destination, moving speed information, and traffic information, and determines whether the identified moving situation has changed. In the instant case, the controller 160 may determine whether the change in the moving situation is a change in the traffic situation, and may further determine whether the route information to the destination has changed when it is determined that it is a change in the traffic situation.

The moving speed information may be traveling speed information. The change in the moving situation of the mobile apparatus 1 may include a change in the traffic situation and a change in a route.

The controller 160 may obtain location information of an inflection point at which the moving situation of the mobile apparatus 1 is to be changed based on at least one of the route information, the moving speed information, and the traffic information, obtain distance information from the current location to a location of the inflection point based on the obtained location information of the inflection point, the map information, the route information, and the current location information, obtain information on an object image of the inflection point to be displayed on a surrounding image based on the obtained distance information, and control the display device 112 to display the object image of the inflection point on the surrounding image based on the obtained information on the object image of the inflection point.

The object image of the inflection point to be displayed in the augmented reality image, which is an image that enables the user to easily recognize a location where the moving situation is changed and a cause of the change in the moving situation, may have a different shape and color depending on a distance to the location where the change in the moving situation occurs and the cause of the change in the moving situation.

The cause of the change in the moving situation of the mobile apparatus 1 may include at least one of a traffic congestion and a traffic accident, and may include a change in a route corresponding to a change in an arrival time to the destination.

The controller 160 may change the display information of the object image of the inflection point based on the current location information and the distance information to the inflection point. In the instant case, the controller 160 may change at least one of the shape and color of the object image of the inflection point.

Figure 6:
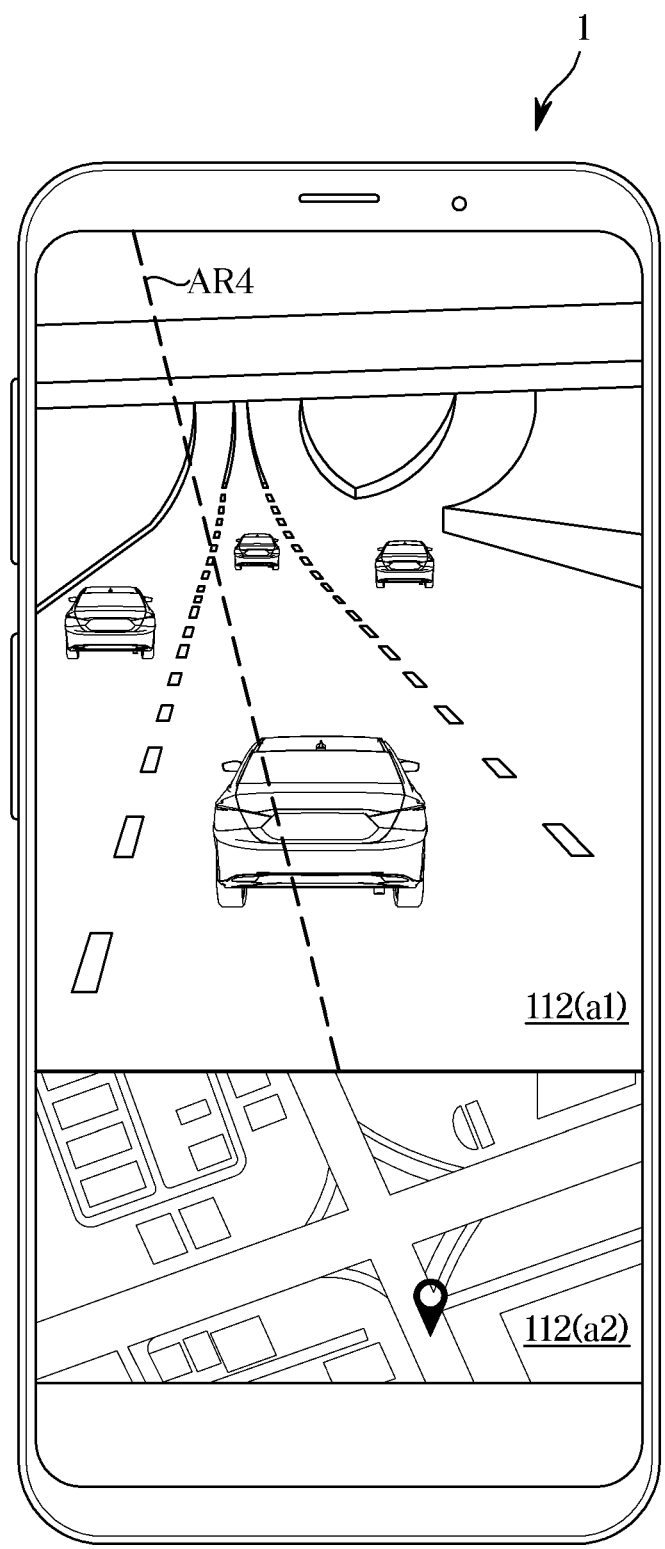

As illustrated in FIG. 6, when it is determined that the distance to the inflection point is greater than or equal to a first reference distance based on the current location information and the distance information to the inflection point, the controller 160 may determine a direction of the destination based on a display position of the current location in the augmented reality image based on the current location information and the location information of the destination, and may control the display device 112 to display an object image of an inflection point directing to the direction of the destination from the display position of the current location. The object image of the inflection point directing to the direction of the destination, which is an oriented object image, may be a dotted line image AR4.

When the dotted line image directing to the direction of the destination is displayed, the controller 160 may control non-display of the dotted line image based on a display-off command input by the input device 111 and control display of the dotted line image based on a display-on command input by the input device 111.

Figure 7A:
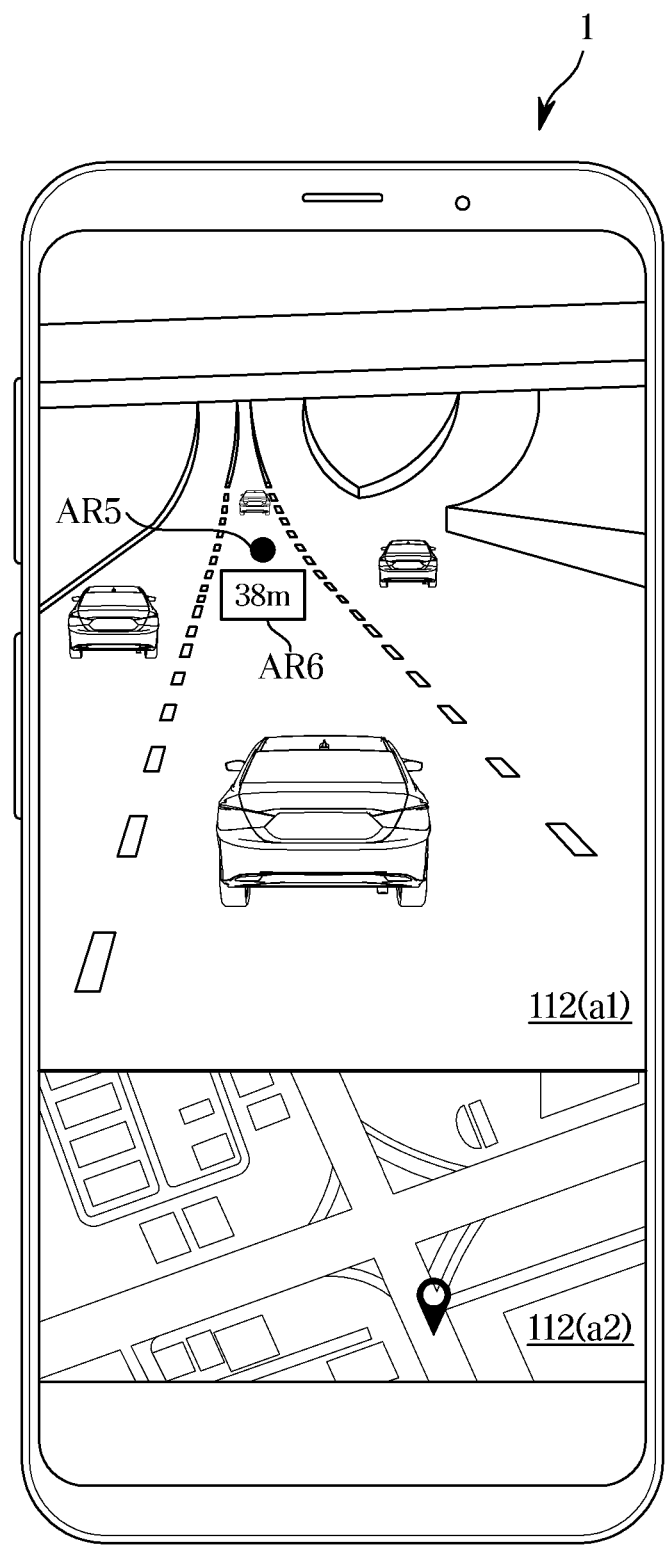

As illustrated in FIG. 7A, when it is determined that the distance to the inflection point is greater than or equal to a second reference distance and less than the first reference distance based on the distance information from the current location to the inflection point, the controller 160 may recognize display location information of the inflection point to display the inflection point in the augmented reality image based on the current location information, the map information, and the location information of the inflection point, control the display device 112 to display an object image AR5 of the inflection point based on the recognized display location information of the inflection point, and control the display device 112 to display the distance information from the current location to the inflection point as a text image AR6 around the object image of the inflection point. The object image AR5 of the inflection point, which is a dot image, may be a long-distance inflection point image indicating a long-distance inflection point.

Figure 7B:
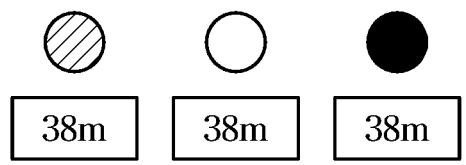

As illustrated in FIG. 7B, when controlling the object image of the inflection point to be displayed as a dot image, the controller 160 may control the display device 112 to display the object image of the inflection point as a dot image of a first color when the cause of the change in the moving situation of the mobile apparatus 1 is smooth driving, may control the display device 112 to display the object image of the inflection point as a dot image of a second color when the cause of the change in the moving situation is a traffic congestion or a traffic accident, and may control the display device 112 to display the object image of the inflection point as a dot image of a third color when the cause of the change in the moving situation is a change to an alternative route.

The first color, the second color, and the third color may be different colors. For example, the first color may be green, the second color may be gray, and the third color may be red.

The controller 160 may determine whether there is a change in the moving situation of the mobile apparatus 1 based on the route information and traffic information from the current location to the destination, may determine whether there is a change in the arrival time to the destination when it is determined that there is a change in the moving situation of the mobile apparatus 1, and when it is determined that there is a change in the arrival time, may control the display device 112 to search for a secondary route which may arrive earlier than an arrival time when moving to a primary route and display the searched secondary route as an alternative route.

When guiding a route based on route information of the changed alternate route, the controller 160 may identify location information of an inflection point at which the route is changed based on primary route information and secondary route information, recognize display location information of the inflection point to display the inflection point in the augmented reality image according to the current location information and the location information of the inflection point, and control the display device 112 to display the inflection point in the recognized display location information as the dot image of the third color.

Figure 8:
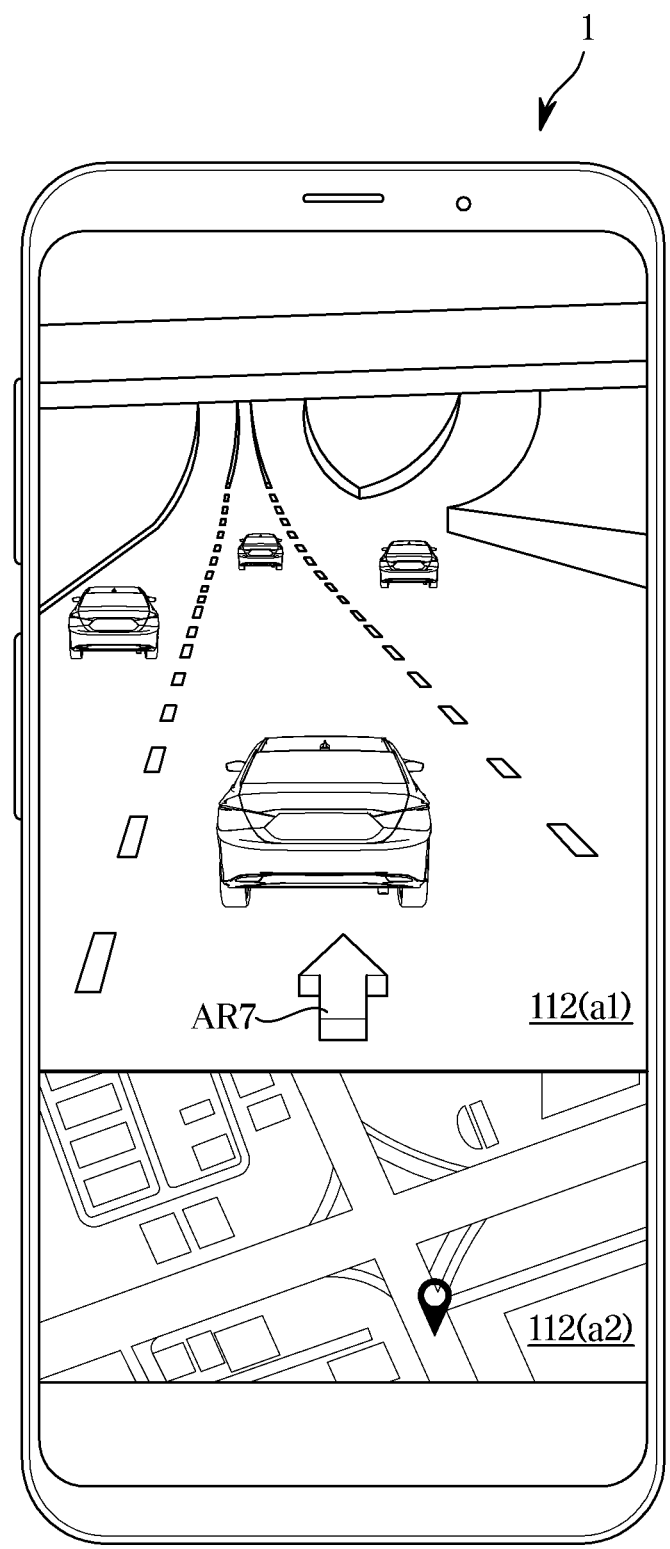

As illustrated in FIG. 8, when it is determined that the distance to the inflection point is less than the second reference distance based on the distance information from the current location to the inflection point, the controller 160 may recognize display location information of the inflection point to display the inflection point in the augmented reality image based on the map information, the current location information, and the location information of the inflection point, and control the display device 112 to display the object image of the inflection point in the recognized display location information as an arrow image. The arrow image may be a short-distance inflection point image indicating a short-distance inflection point.

When controlling the object image of the inflection point to be displayed as the arrow image, the controller 160 may control the display device 112 to display the object image of the inflection point as the arrow image of the first color when the moving situation of the mobile apparatus 1 is maintained, control the display device 112 to display the object image of the inflection point as the dot image of the second color when the cause of the change in the moving situation is a traffic congestion or a traffic accident, and control the display device 112 to display the object image of the inflection point as the arrow image of the third color when the cause of the change in the moving situation is the change of the route.

The maintaining of the moving situation may include maintaining the route to the destination as the primary route.

The first color, the second color, and the third color of the arrow image may be different colors. For example, the first color may be green, the second color may be gray, and the third color may be red.

When it is determined that there is a plurality of adjacent inflection points based on the route information, the controller 160 may change the second reference distance to a third reference distance. The third reference distance may be longer than the second reference distance and shorter than the first reference distance. The adjacent inflection points may be inflection points existing within a preset distance.

The adjacent inflection points may exist at positions adjacent to an interchange (IC) or a junction change (JC). The third reference distance may be set by the user.

The controller 160 identifies whether the positions of the object images of the respective inflection points in the augmented reality image, that is, the display position of the dotted line image, the display position of the arrow image, and the display position of the dot image coincide with each other.

Figure 9:
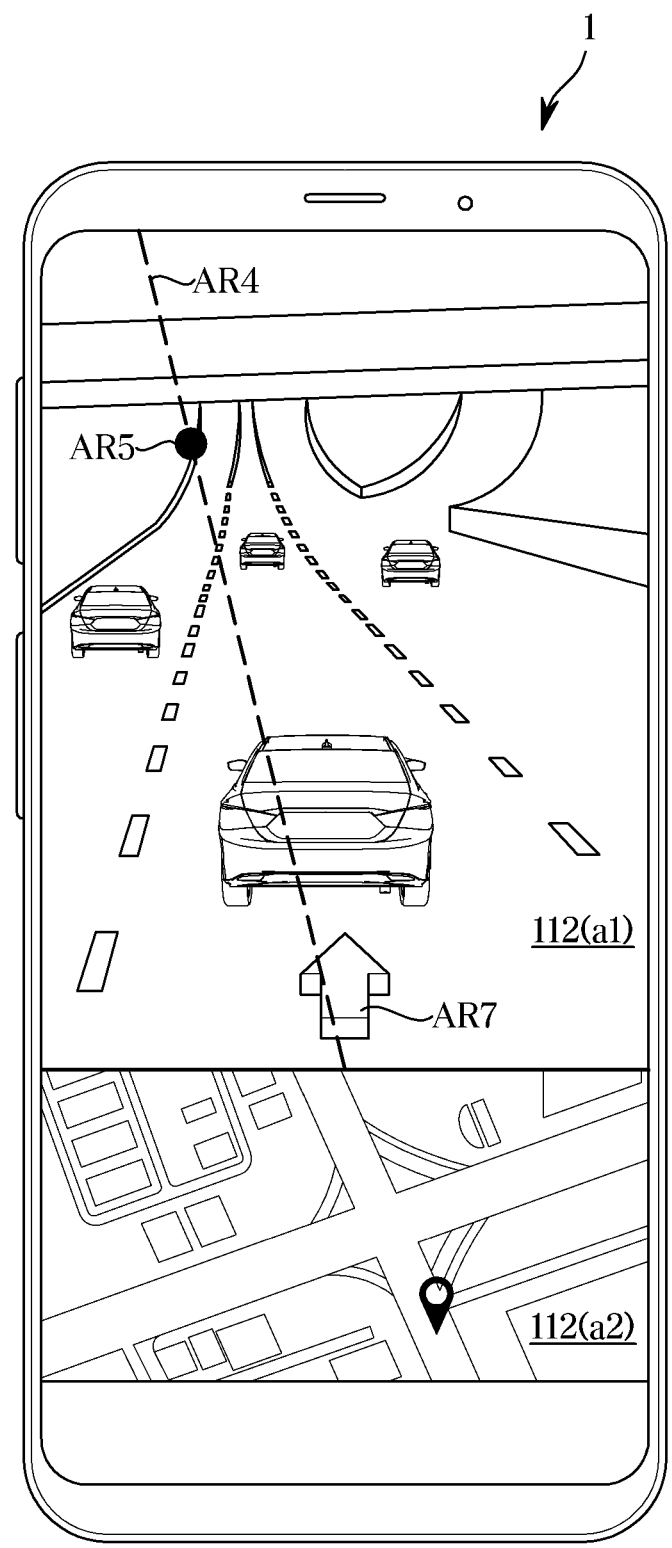

As illustrated in FIG. 9, when it is determined that the display position of the dotted line image AR4 coincides with the display position of the arrow image AR7, and the display position of the dotted line image AR4 coincides with the display position of the dot image AR5, the controller 160 may control display of information on the remaining time and the remaining distance to the destination, control the display device 112 to display road name information on a road name to be moved to the destination and left turn and right turn information, control a change in colors of the image of the short-distance inflection point and the image of the long-distance inflection point based on the traffic information, and control route guidance until arriving at the destination when it is determined that the current location is adjacent to the destination.

When it is determined that the current location is adjacent to the destination, the controller 160 may control the display device 112 to delete the navigation image and display the augmented reality image on the entire region of the display device 112, and control the display device 112 to display an arrow image and a straight line image for guiding a route to the destination on the augmented reality image.

Figure 10:
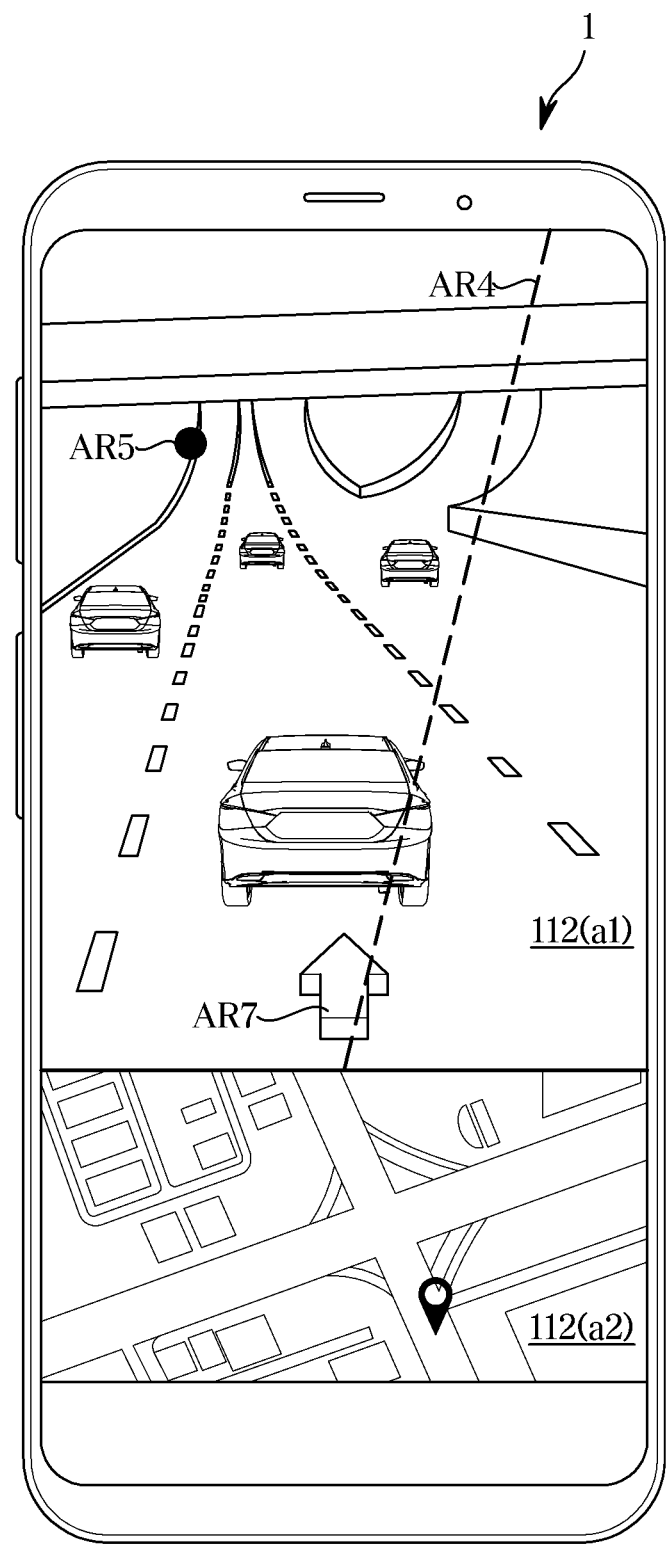

As illustrated in FIG. 10, when it is determined that the display position of the dotted line image AR4 coincides with the display position of the arrow image AR7 and the display position of the dotted line image AR4 does not coincide with the display position of the dot image AR5, the controller 160 may also control the display device 112 to additionally display the traffic information as a text image. In the instant case, the controller 160 may change the color of the image of the long-distance inflection point based on the traffic information and control to display the traffic information as the text image for only a certain time period.

Figure 11:
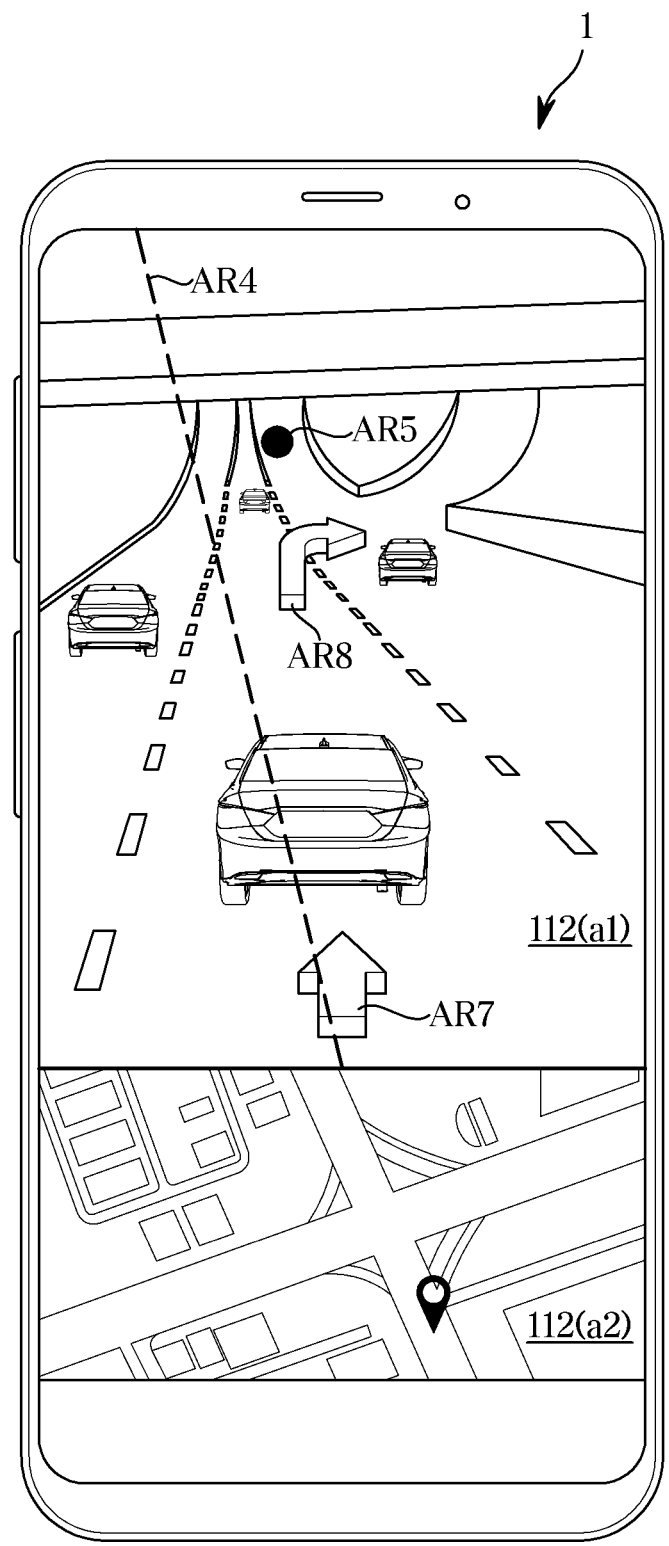

As illustrated in FIG. 11, when it is determined that the display position of the dotted line image AR4 does not coincide with the display position of the arrow image AR7 and the display position of the dotted line image AR4 coincides with the display position of the dot image AR5, the controller 160 may control the display device 112 to display the traffic information and an alternative route information AR8.

The traffic information may include pictogram image information indicating the traffic congestion or the traffic accident.

The controller 160 may control the display device 112 to display the navigation image, determine whether the current location is adjacent to the destination based on at least one of expected arrival time information of the destination, current time information, reference distance information, the moving speed information, the current location information, and the destination information, and control the display device 112 to display the augmented reality image when it is determined that the current location is adjacent to the destination.

When it is determined that the current location is adjacent to the destination, the controller 160 may recognize an image of a subject (e.g., a building) corresponding to the destination information among subject images in an image obtained by the image obtaining device 140 based on the map information, image information obtained by the image obtaining device 140, and the destination information, and display an emphasized object image for emphasizing a destination based on display location information of the recognized subject image.

The map information may be information stored in the storage device 161, and may be received from the server 2. The map information may include building information and multi-use facility information, and may further include address information and parking lot location information of each building or multi-use facility.

The emphasized object image for emphasizing the destination may include a highlight image or a polygonal image for visually identifying a subject image corresponding to the destination information, and may include a polygonal image formed by a dotted line.

For example, the controller 160 may recognize a region of the subject image corresponding to the destination information, recognize an edge portion of the recognized region, and match and display the polygonal image formed by the dotted line with the recognized edge portion. The polygonal image formed by the dotted line may be the same as or similar to a shape forming the recognized edge portion.

The controller 160 may recognize the region of the subject image corresponding to the destination information, and overlap and display a polygonal image of a preset color in the recognized region, so that the destination image may be displayed as a highlight image.

The controller 160 may recognize a subject image corresponding to the destination information, recognize the vertical plane based on location information of an image of the recognized subject, control the display device 112 to display the grid image based on location information of the recognized vertical plane, and to display the anchoring mark image based on the location information of the grid image and the location information of the subject image.

The controller 160 may recognize a subject image corresponding to the destination information, and adjust transparency of the remaining subject images second subject images) other than the recognized subject image (i.e., a first subject image) to be different from transparency of the first subject image.

For example, the controller 160 may maintain the transparency of the first subject image, and adjust the transparency of the second subject image to a higher transparency than that of the first subject image.

The controller 160 may adjust the transparency of the first subject image to a first transparency, and adjust the transparency of the second subject image to a second transparency. The second transparency may be higher than the first transparency.

The controller 160 may overlap and display a polygonal shape image of the preset color in the region of the first subject image.

The controller 160 may determine whether a moving speed is less than the reference speed based on the moving speed information, determine whether the distance from the current location to the destination is less than or equal to a set distance based on the current location information and the location information of the destination when it is determined that the moving speed is less than the reference speed, recognize a subject image corresponding to the destination information when it is determined that the distance from the current location to the destination is less than or equal to the set distance, and control the display device 112 to display an emphasized object image indicating the destination on the image of the recognized subject.

When it is determined that the distance from the current location to the destination is less than or equal to the set distance, the controller 160 may obtain information on the remaining time until the arrival of the destination and information on the remaining distance, control display of the obtained remaining time information and remaining distance information, and control the display device to display the road name information and the left turn and right turn information for the road name to be moved to the destination.

The storage device 161 stores the map information.

The storage device 161 stores information on the first, second, and third reference distances, stores information on the set distance, and stores color information of the dot image corresponding to the long-distance inflection point and color information of the arrow image corresponding to the short-distance inflection point.

The storage device 161 may store information on the object image for guiding a road and store information on the object image indicating the destination.

The storage device 161 may store location information on the point of interest. The point of interest may be a point selected by the user.

The storage device 161 may be implemented as at least one of a non-volatile memory device such as a cache, a Read-Only Memory (ROM), a Programmable ROM (PROM), an Erasable Programmable ROM (EPROM), an Electrically Erasable Programmable ROM (EEPROM), and a flash memory, a volatile memory device such as a Random Access Memory (RAM), and a storage medium such as a Hard disk drive (HDD) and a CD-ROM, but is not limited thereto. The storage device 161 may be a memory implemented as a chip separate from the processor described above with respect to the controller 160, or may be implemented as a single chip with the processor.

At least one component may be added or deleted depending on the performance of the components of the mobile apparatus 1 illustrated in FIG. 1. It will be readily understood by those skilled in the art that the mutual positions of the components may be changed depending on the performance or structure of the system.

Each component illustrated in FIG. 1 means a software and/or hardware component such as a field programmable gate array (FPGA) and an application specific integrated circuit (ASIC).

Figure 12A:
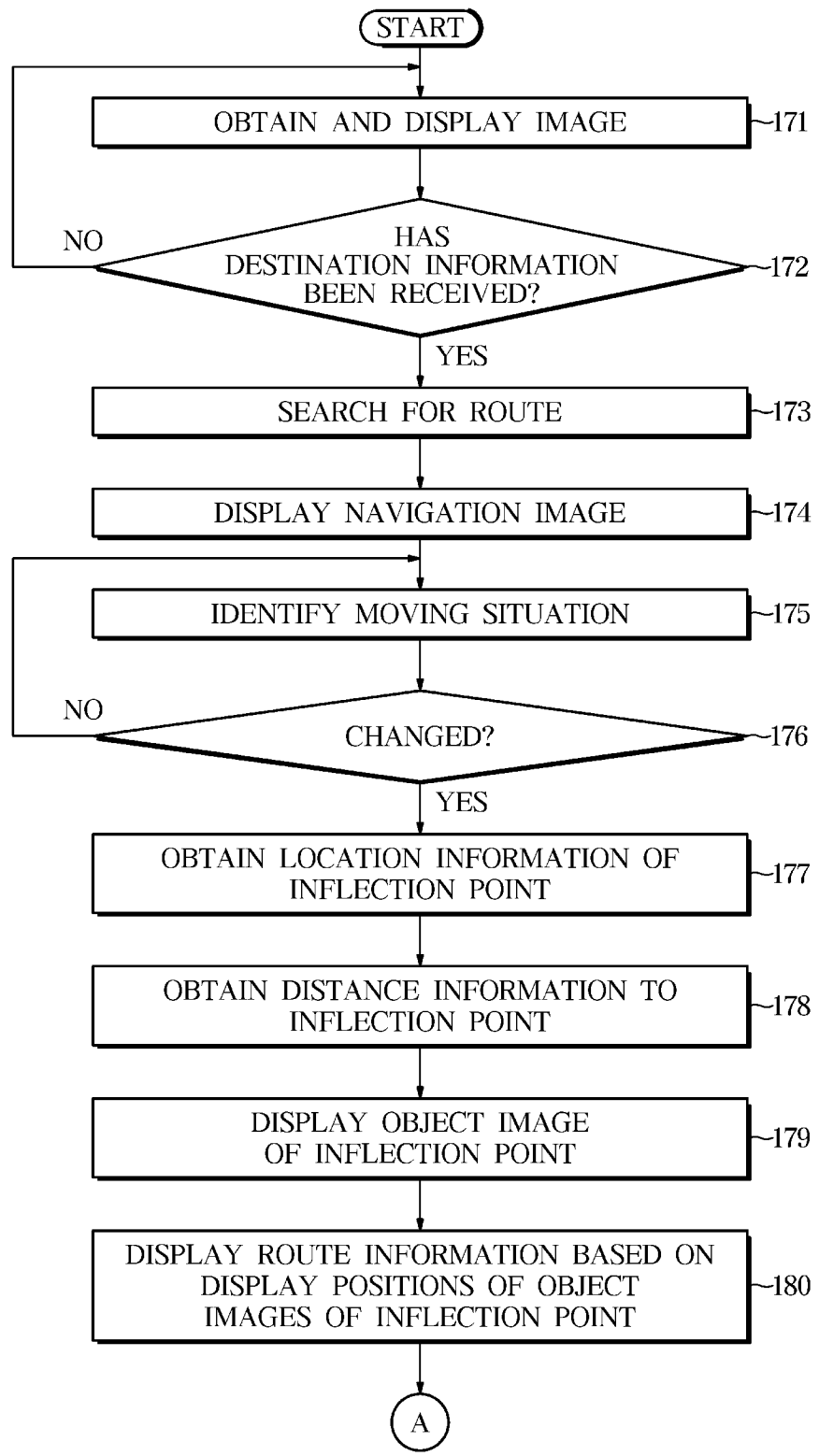
FIG. 12A and FIG. 12B are control charts of the mobile apparatus according to various exemplary embodiments of the present invention.
Figure 12B:
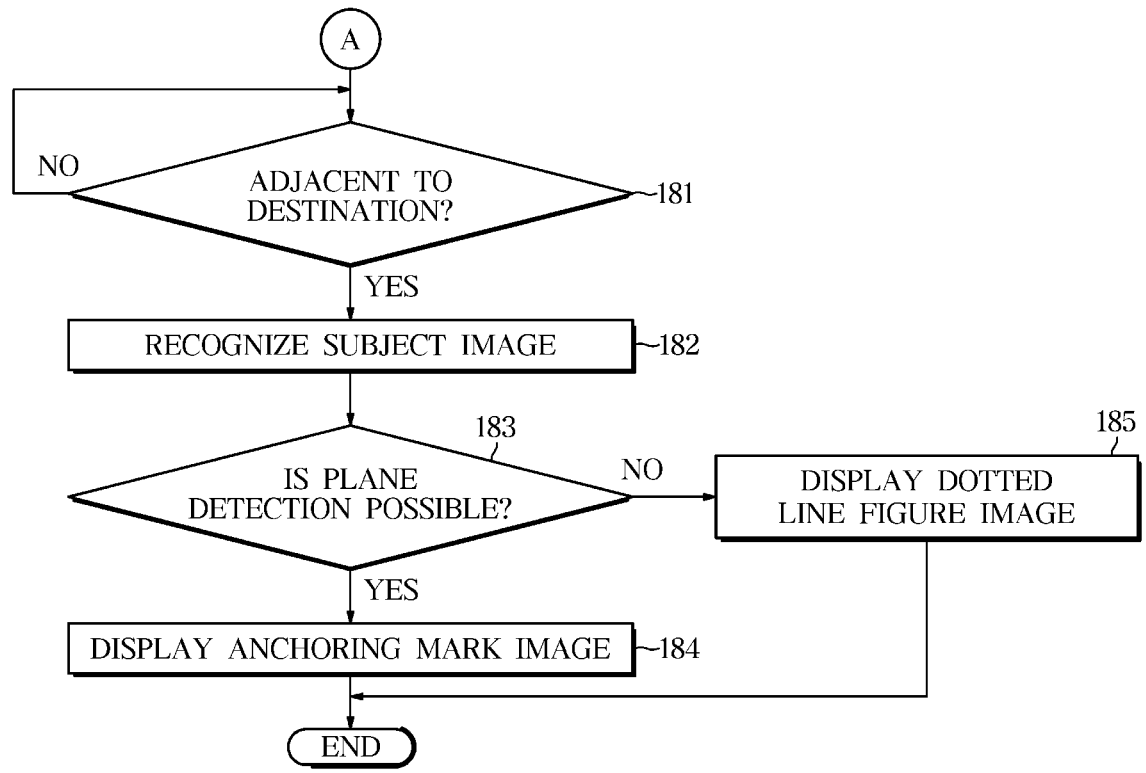

FIG. 12A and FIG. 12B are control flowcharts of the mobile apparatus according to various exemplary embodiments of the present invention.

The mobile apparatus 1 may perform the augmented reality function through the execution of the augmented reality application when the execution command of the augmented reality application is received by the input device 111. In the instant case, the mobile apparatus 1 may obtain an image through the image obtaining device 140 and display the obtained image through the display device 112 (171).

When the destination information is received by the input device 111 in a state in which the augmented reality function is performed (172), the mobile apparatus 1 may execute the navigation application and transmit the destination information to the navigation application.

The mobile apparatus 1 may control the activation of the location receiver 130 in response to the execution of the navigation application.

The mobile apparatus 1 searches for a route from the current location to the destination based on the current location information and the destination information through the execution of the navigation application (173), and displays a navigation image in which the route information and the route guidance information for the searched route match the map information (174). In the instant case, the mobile apparatus 1 may display the augmented reality image in a partial region of the display device 112 and display the navigation image in another region.

The mobile apparatus 1 periodically identifies the current location information while displaying the navigation image. The mobile apparatus 1 may display information on the total required time to reach the destination, and may display information on the arrival time of the final destination.

The mobile apparatus 1 identifies the moving situation of the mobile apparatus 1 based on at least one of the route information from the current location to the destination, the moving speed information, and the traffic information (175), and determines whether the identified moving situation has changed (176). In the instant case, the mobile apparatus 1 may determine whether the change in the moving situation is a change in the traffic situation, and may further determine whether the route information to the destination has changed when it is determined that it is a change in the traffic situation.

The moving speed information may be the traveling speed information. The change in the moving situation of the mobile apparatus 1 may include a change in the traffic situation and a change in the route.

The mobile apparatus 1 may obtain location information of an inflection point at which the moving situation of the mobile apparatus 1 is to be changed based on at least one of the route information (177), the moving speed information, and the traffic information, obtain distance information from the current location to a location of the inflection point based on the obtained location information of the inflection point and the current location information (178), obtain information on an object image to be displayed in the augmented reality image based on the obtained distance information, and display the object image in the augmented reality image based on the obtained information on the object image (179).

The object image to be displayed in the augmented reality image, which is an image that enables the user to easily recognize a location where the moving situation is changed and a cause of the change in the moving situation, may have a different shape and color depending on a distance to the location where the change in the moving situation occurs and the cause of the change in the moving situation.

The cause of the change in the moving situation of the mobile apparatus 1 may include at least one of the traffic congestion and the traffic accident, and may include a change in the route corresponding to a change in the arrival time to the destination.

When it is determined that the distance to the inflection point is greater than or equal to the first reference distance based on the current location information and the distance information to the inflection point, the mobile apparatus 1 may identify the direction of the destination based on the display position of the current location in the augmented reality image based on the current location information, the route information, the map information, and the location information of the destination, and may display the object image of the inflection point directing to the direction of the destination from the display position of the current location. The object image of the inflection point directing to the direction of the destination may be the dotted line image AR4.

The mobile apparatus 1 may display the object image of the long-distance inflection point when it is determined that the distance to the inflection point is greater than or equal to the second reference distance and less than the first reference distance based on the distance information from the current location to the inflection point, and may display the object image of the short-distance inflection point when it is determined that the distance to the inflection point is less than the second reference distance.

The object image of the long-distance inflection point may be displayed as a dot image, and the distance information from the current location to the inflection point around the dot image may be displayed as a text image.

When the object image of the long-distance inflection point is displayed, the object image may be displayed as a dot image of the first color when the traffic situation is a smooth situation, may be displayed as a dot image of the second color when a traffic congestion or a traffic accident occurs, and may be displayed as a dot image of the third color when the route is changed to an alternate route.

The object image of the short-distance inflection point may be displayed as an arrow image.

When the object image of the short-distance inflection point is displayed, the object image may be displayed as an arrow image of the first color when the primary route is maintained, may be displayed as an arrow image of the second color when a traffic congestion or a traffic accident occurs, and may be displayed as an arrow image of the third color when the route is changed to an alternate route.

After displaying the object image of the inflection point in the augmented reality image, the mobile apparatus 1 identifies whether the display position of the dotted line image, the display position of the object image (i.e., the arrow image) of the short-distance inflection point, and the display position of the object image (i.e., the dot image) of the long-distance inflection point coincide with each other, and additionally displays the route guidance information in response to the identification result (180).

When it is determined that the display position of the dotted line image in the augmented reality image coincides with the display position of the arrow image, and the display position of the dotted line image coincides with the display position of the dot image, the mobile apparatus 1 may display the information on the remaining time and the remaining distance to the destination, display the road name information on the road name to be moved to the destination and the left turn and right turn information, change the colors of the image of the short-distance inflection point and the image of the long-distance inflection point based on the traffic information, and control the route guidance until arriving at the destination when it is determined that the current location is adjacent to the destination.

The mobile apparatus 1 may determine whether the moving speed is less than the reference speed based on the moving speed information, determine whether the distance from the current location to the destination is less than or equal to the set distance based on the current location information and the location information of the destination when it is determined that the moving speed is less than the reference speed, recognize a subject image corresponding to the destination information when it is determined that the distance from the current location to the destination is less than or equal to the set distance, and control the display device 112 to display the object image indicating the destination on the image of the recognized subject.

The mobile apparatus 1 may display the navigation image and the augmented reality image together during moving from a time point of departure, and may display the augmented reality image by switching an image display mode when it is determined that the current time point corresponds to the information on the arrival time.

When displaying the navigation image and the augmented reality image together during moving from the time point of departure, the mobile apparatus 1 may display only the object image among the augmented reality images on the navigation image.

When it is determined that the current time point corresponds to the information on the arrival time, the mobile apparatus 1 may display the augmented reality image and the navigation image separately while displaying the augmented reality image greater than the navigation image. In the instant case, the mobile apparatus 1 may display the object image on the surrounding image obtained when displaying the augmented reality image. When the destination is changed, the mobile apparatus 1 may display information on possible arrival time at the changed destination.

When it is determined that the current location is adjacent to the destination, the mobile apparatus 1 may delete the navigation image and display the augmented reality image on the entire region of the display device 112, and display an arrow image and a straight line image for guiding a route to the destination on the augmented reality image.

When it is determined that the display position of the dotted line image coincides with the display position of the arrow image and the display position of the dotted line image does not coincide with the display position of the dot image, the mobile apparatus 1 additionally displays the traffic information as a text image. In the instant case, the mobile apparatus 1 may change the color of the image of the long-distance inflection point based on the traffic information and display the traffic information as the text image for only a certain time period.

When it is determined that the display position of the dotted line image does not coincide with the display position of the arrow image and the display position of the dotted line image does not coincide with the display position of the dot image, the mobile apparatus 1 displays the traffic information and an alternative route information.

The traffic information may include the pictogram image information indicating the traffic congestion or the traffic accident.

The mobile apparatus 1 may determine whether the current location is adjacent to the destination based on the current location information and the destination information during performing the navigation function (181), and may switch to the augmented reality image when it is determined that the current location is adjacent to the destination.

The determining of whether the current location is adjacent to the destination may include obtaining the distance information between the current location and the destination based on the current location information and the destination information, and determining that the current location is adjacent to the destination when it is determined that the distance between the current location and the destination is less than or equal to a predetermined distance based on the obtained distance information and the predetermined distance information.

The mobile apparatus 1 may determine whether the current location is adjacent to the destination based on an expected arrival time of the destination and the current time. That is, the mobile apparatus 1 may obtain the remaining time until arriving at the destination based on the expected arrival time of the destination and the current time, and determine that the current location is adjacent to the destination when the obtained remaining time is less than or equal to the predetermined time period.

When it is determined that the current location is adjacent to the destination, the mobile apparatus 1 may recognize the subject image corresponding to the destination information among the subject images in the image obtained by the image obtaining device 140 based on the map information, the image information obtained by the image obtaining device 140, and the destination information (182), and display the emphasized object image for emphasizing the destination based on the display location information of the recognized object image.

The emphasized object image for emphasizing the destination may include a highlight image or a polygonal image for visually identifying a subject image corresponding to the destination information, and may include a polygonal image formed by the dotted line.

The emphasized object image for emphasizing the destination may include a polygonal image of a preset color overlapping a region of the subject image.

When it is determined that the moving speed is less than the reference speed and the distance to the destination is less than a predetermined distance based on the moving speed information, the mobile apparatus 1 may determine whether plane detection is possible (183), display the anchoring mark image at a position adjacent to the subject image when it is determined that the plane detection is possible (184), and display a dotted line figure image on the subject image when it is determined that the plane detection is impossible (185).

The displaying of the anchoring mark image may include recognizing a subject image corresponding to the destination information, recognizing the vertical plane based on location information of the recognized subject image, displaying the grid image based on the recognized location information of the vertical plane, and displaying the anchoring mark image based on the location information of the grid image and the location information of the subject image.

The mobile apparatus 1 may recognize the subject image corresponding to the destination information, and adjust the transparency of the remaining subject images (i.e., the second subject images) other than the recognized subject image (i.e., the first subject image) to be different from the transparency of the first subject image.

The mobile apparatus 1 may terminate the augmented reality application and the navigation application when a destination arrival command is received by the user.

Figure 13:
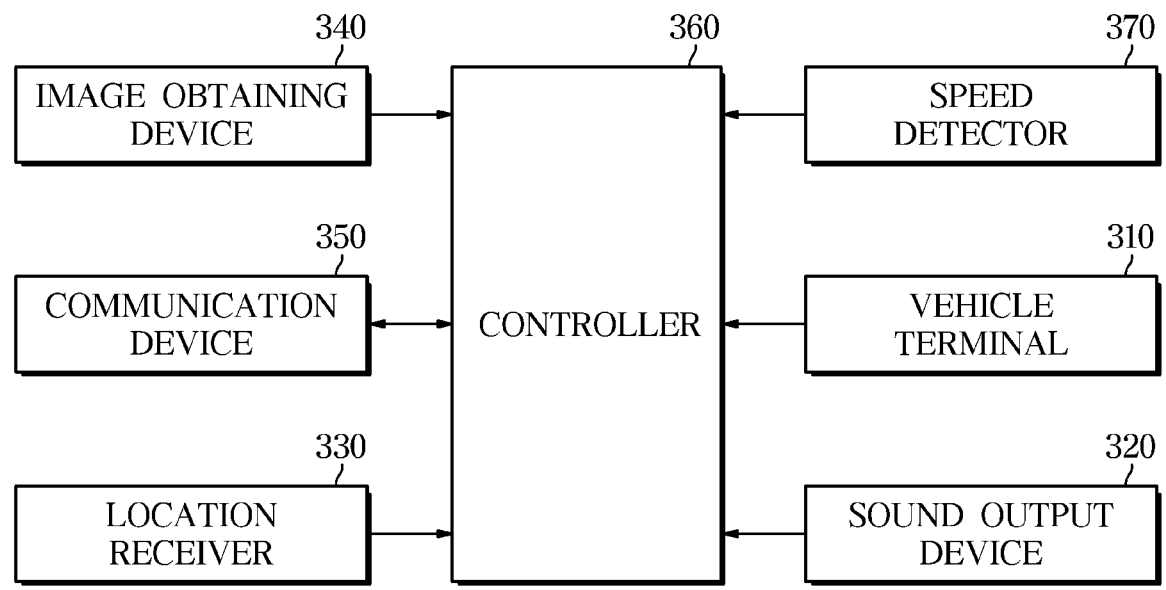
FIG. 13 is a control schematic diagram of a vehicle according to another exemplary embodiment of the present invention.

FIG. 13 is a control schematic diagram of a vehicle according to another exemplary embodiment of the present invention.

A vehicle 3 includes a body having an exterior and an interior, and a chassis in which mechanical devices necessary for driving are installed as the remaining parts except for the body.

The chassis of the vehicle 3, which is a frame for supporting the body, is provided with wheels disposed on the front, rear, left, and right, respectively, a power device configured for providing a driving force to the front, rear, left, and right wheels, a steering device, a braking device configured for providing a braking force to the front, rear, left, and right wheels, and a suspension device configured for adjusting suspension of the vehicle 3.

The exterior of the body includes a front panel, a bonnet, a roof panel, a rear panel, front, rear, left, and right doors, and window glasses provided on the front, rear, left, and right doors to be opened and closed, respectively.

The exterior of the body further includes an antenna for receiving a signal from a Global Positioning System (GPS) satellite, a broadcasting station, and the like and performing a wireless vehicle network (vehicle to everything (V2X) such as communication with other vehicles (V2V) and communication with an infrastructure (V2I).

The interior of the body includes seats on which occupants sit, a dashboard, an instrument panel (i.e., a cluster) disposed on the dashboard and including a tachometer, a speedometer, a coolant thermometer, a fuel gauge, turn indicators, high beam indicators, a warning lamp, a seat belt warning lamp, a trochometer, an odometer, a shift lever indicator light, a door open warning light, an engine oil warning light, and a low fuel warning light, a center fascia provided with vents and control panels of an air conditioner, and a head unit provided on the center fascia to receive operation commands of an audio device and the air conditioner.

The vehicle 3 includes a vehicle terminal 310 for user convenience. The vehicle terminal 310 may be installed on the dashboard in a buried or mounted manner.

The vehicle terminal 310 may receive a user input and display information on various functions performed in the vehicle 3 as an image.

The various functions may include an audio function, a video function, a navigation function, a broadcasting function, a radio function, a content reproduction function, and a function of at least one application installed by a user among Internet search functions.

The vehicle terminal 310 may include a display panel as a display device, and may further include a touch panel as an input device. The vehicle terminal 310 may include only the display panel or a touch screen in which the touch panel is integrated with the display panel.

When the vehicle terminal 310 is implemented with only the display panel, a button displayed on the display panel may be selected using an input device provided on the center fascia.

The vehicle terminal 310 may include an input device and a display device. The input device and the display device of the vehicle 3 are the same as the input device and the display device of the mobile apparatus, and thus descriptions thereof will be omitted.

The vehicle terminal 310 may perform various control functions performed by the controller of the mobile apparatus according to various exemplary embodiments of the present invention. A control configuration for the navigation function and the augmented reality function performed by the vehicle terminal 310 is the same as the control configuration for the function performed by the controller of the mobile apparatus according to various exemplary embodiments of the present invention, and thus a description thereof will be omitted.

The vehicle terminal 310 may further include a storage device configured for storing map information and location information of the POI.

A sound output device 320 outputs audio data corresponding to a function of currently being performed in the vehicle 3 as a sound.

The function of currently being performed may be the radio function, the audio function corresponding to content reproduction and music reproduction, and the navigation function.

The sound output device 320 may include a speaker. One or a plurality of the speakers may be provided.

The speaker may be provided in the vehicle terminal 310.

A location receiver 230 includes a global positioning system (GPS) receiver and a signal processing device configured for processing a UPS signal obtained from the GPS receiver.

The vehicle 3 may further include an image Obtaining device 340 for obtaining an image of the surroundings. The image obtaining device 340 may be an image obtaining device provided in a black box, may be an image obtaining device of an autonomous driving control device configured for autonomous driving, or may be an image obtaining device configured for obstacle detection.

The image obtaining device 340 may be provided on the front window glass, but may also be provided on the window glass inside the vehicle 3, may be provided on a rearview mirror inside the vehicle 3, or may be provided on the roof panel to be exposed to the outside.

The image obtaining device 340 may further include at least one of left and right cameras for obtaining images of the left and right of the vehicle 3, and a rear camera for obtaining an image of the rear of the vehicle 3 as well as a front camera for Obtaining an image of the front of the vehicle 3.

The image obtaining device 340 may include a CCD) or CMOS image sensor as a camera, and may include a 3D spatial recognition sensor such as a KINECT (RGB-D) sensor), a TOF (Structured Light Sensor), and a stereo camera.

The vehicle 3 may further include a communication device 350 for communication between various internal electronic devices, communication with a user terminal, and communication with a server.

The communication device 350 may communicate with an external device through an antenna.

The external device may include at least one of a server, a user terminal, other vehicles, and an infrastructure.

The communication method using the antenna may include a second generation (2G) communication method such as a Time Division Multiple Access (TDMA) and a Code Division Multiple Access (CDMA), a third generation (3G) communication method such as an Wideband Code Division Multiple Access (WCDMA), a Code Division Multiple Access 2000 (CDMA 2000), a Wireless Broadband Internet (WiBro), and a Worldwide Interoperability for Microwave Access (WiMAX), a fourth generation (4G) communication method such as Long Term Evolution (LTE) and a wireless Broadband Evolution (WBE), or a fifth generation (5G) communication method.

A controller 360 controls communication between the vehicle terminal 310 and the image obtaining device 340, a location receiver 330, and the sound output device 320.

The controller 360 may transmit image information of the image obtaining device 340 to the vehicle terminal 310, may transmit location information of the location receiver 330 to the vehicle terminal 310, and may transmit sound information of the vehicle terminal 310 to the sound output device 320.

The vehicle 3 may further include a speed detector 370 for detecting a traveling speed (i.e., a moving speed of the vehicle).

The speed detector 370 may be a wheel speed sensor provided on each of the plurality of wheels, or may be an acceleration sensor.

The controller 360 may obtain a driving speed of the vehicle 3 based on a wheel speed detected by the plurality of wheel speed sensors, may obtain the driving speed of the vehicle 3 based on an acceleration detected by the acceleration sensor, or may obtain the driving speed of the vehicle based on the wheel speed detected by the plurality of wheel speed sensors and the acceleration detected by the acceleration sensor.

The controller 360 may transmit the obtained driving speed to the vehicle terminal 310 to obtain the expected arrival time of the destination or the remaining time until the destination.

The controller 360 may also perform all control operations performed by the controller of the mobile apparatus according to various exemplary embodiments of the present invention.

At least one component may be added or deleted depending on the performance of the components of the vehicle 3 illustrated in FIG. 13. It will be readily understood by those skilled in the art that the mutual positions of the components may be changed depending on the performance or structure of the system.

Each component illustrated in FIG. 13 means a software and/or hardware component such as a field programmable gate array (FPGA) and an application specific integrated circuit (ASIC).

Herein, the disclosed exemplary embodiments may be implemented in a form of a recording medium storing instructions executable by a computer. The instructions may be stored in a form of program code, and when executed by a processor, a program module may be created to perform the operations of the disclosed exemplary embodiments. The recording medium may be implemented as a computer-readable recording medium.

The computer-readable recording medium includes various kinds of recording media in which instructions which may be decrypted by a computer are stored. For example, there may be a Read-Only Memory (ROM), a Random Access Memory (RAM), a magnetic tape, a magnetic disk, a flash memory, an optical data storage device, and the like.

As is apparent from the above, the present invention can allow a user to travel comfortably and easily to a destination by displaying a location of the destination using an object image through plane detection technology and cloud anchoring technology, maintaining the utility of commercial services.

Furthermore, the present invention can allow the user to accurately recognize the location of the destination by displaying a point of interest (POI) such as the destination with emphasis or with adjustment of transparency using an object image by an augmented reality function.

Furthermore, the present invention can allow the user to understand the overall route guidance situation by displaying a direction of the destination and a location of an inflection point through the object image by the augmented reality function and displaying a congestion section and an accident section, and suggesting alternative routes in real time.

Therefore, the present invention can improve the quality and merchantability of a mobile apparatus and vehicle, increase user satisfaction, improve user convenience, reliability, and vehicle safety, and secure product competitiveness.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described in order to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A mobile apparatus comprising:
an input device configured to receive a user input;
a location receiver configured to receive current location information for obtaining a current location;
an image obtaining device configured to obtain an image of a surrounding environment;
a display device configured to display the surrounding image obtained from the image obtaining device in response to execution of an augmented reality mode; and
a controller configured to search for a route from the current location to a destination when destination information is received from the user input during the execution of the augmented reality mode, identify a moving situation according to route information corresponding to the searched route, obtain location information of an inflection point at which the moving situation is changed according to information on the identified moving situation, obtain a distance from the current location to the inflection point according to the current location information and the location information of the inflection point, determine an object image of the inflection point based on the obtained distance, a first reference distance, and a second reference distance, and control the display device to display the object image of the inflection point on the surrounding image displayed on the display device according to the location information of the inflection point and the current location information,
wherein the controller is configured to change the second reference distance to a third reference distance when the controller concludes that there is a plurality of the inflection points within a preset distance according to the route information, and
wherein the first reference distance is longer than the second reference distance, and the third reference distance is longer than the second reference distance and shorter than the first reference distance.

2. The mobile apparatus of claim 1,
wherein the controller is configured to change display information of the object image of the inflection point according to obtained distance information, and
wherein the display information of the object image of the inflection point includes at least one of shape information and color information of the object image.

3. The mobile apparatus of claim 2, wherein when the controller concludes that the distance to the inflection point is greater than or equal to the first reference distance, the controller is configured to identify a direction of the destination according to the current location information, the destination information, and map information, and to control the display device to display the object image oriented from the current location to the direction of the destination on the surrounding image displayed on the display device.

4. The mobile apparatus of claim 2,
wherein when the controller concludes that the distance to the inflection point is less than the first reference distance and greater than or equal to the second reference distance, the controller is configured to determine the object image of the inflection point as an object image of a long-distance inflection point.

5. The mobile apparatus of claim 4,
wherein when the controller concludes that the distance to the inflection point is less than the second reference distance, the controller is configured to determine the object image of the inflection point as an object image of a short-distance inflection point.

6. The mobile apparatus of claim 5, wherein the controller, according to the information on the identified moving situation, is configured to control the display device:
to display the object image of the short-distance inflection point in a first color when the controller concludes that the moving situation is a route maintenance situation,
to display the object image of the short-distance inflection point in a second color when the controller concludes that the moving situation is a congestion situation or an accident situation, and
to display the object image of the short-distance inflection point in a third color when the controller concludes that the moving situation is a route change situation.

7. The mobile apparatus of claim 5,
wherein the controller is configured to control the display device to display traffic information when the controller concludes that a display position of the oriented object image coincides with a display position of the object image of the short-distance inflection point and does not coincide with a display position of the object image of the long-distance inflection point.

8. The mobile apparatus of claim 5,
wherein the controller is configured to control the display device to display traffic information and alternative route information when the controller concludes that a display position of the oriented object image does not coincide with a display position of the object image of the short-distance inflection point and does not coincide with a display position of the object image of the long-distance inflection point.

9. The mobile apparatus of claim 4,
wherein according to the information on the identified moving situation, the controller is configured to control the display device:
to display the object image of the long-distance inflection point in a first color when the controller concludes that the moving situation is a smooth situation,
to display the object image of the long-distance inflection point in a second color when the controller concludes that the moving situation is a congestion situation or an accident situation, and
to display the object image of the long-distance inflection point in a third color when the controller concludes that the moving situation is a route change situation.

10. The mobile apparatus of claim 9,
wherein when traffic information is received by the controller, the controller is configured to determine whether a route change is necessary according to the received traffic information, the destination information, the current location information, the route information, and map information.

11. The mobile apparatus of claim 1,
wherein the controller is configured to determine whether a distance to the destination is less than or equal to a predetermined distance according to the destination information, the current location information, the route information, and map information,
wherein the controller is configured to recognize a destination image corresponding to the destination information from the surrounding image when the controller concludes that the distance to the destination is less than or equal to the predetermined distance, and
wherein the controller is configured to control the display device to overlap and display an emphasized object image on the recognized destination image.

12. The mobile apparatus of claim 11,
wherein the controller is configured to determine whether the distance to the destination is less than or equal to the predetermined distance according to the destination information, the current location information, the route information, and the map information,
wherein the controller is configured to recognize the destination image corresponding to the destination information from the surrounding image when the controller concludes that the distance to the destination is less than or equal to the predetermined distance, and
wherein the controller is configured to control transparency of the recognized destination image and remaining images to be different from each other.

13. The mobile apparatus of claim 11, wherein the controller is configured to:
recognize a ground image adjacent to the destination image from the surrounding image,
control the display device to display a grid-shaped object image on the recognized ground image, and
control the display device to overlap and display an anchoring mark image on the destination image.

14. A vehicle comprising:
an input device configured to receive a user input;
a location receiver configured to receive current location information for obtaining a current location;
a speed detector configured to detect a driving speed;
an image obtaining device configured to obtain an image of a surrounding environment;
a display device configured to display the surrounding image obtained from the image obtaining device in response to execution of an augmented reality mode; and
a controller configured to search for a route from the current location to a destination when destination information is received by the controller from the user input during interworking of the augmented reality mode and a navigation mode, to identify a moving situation according to route information corresponding to the searched route and driving speed information detected by the speed detector, to obtain location information of an inflection point at which the moving situation is changed according to information on the identified moving situation, to obtain a distance from the current location to the inflection point according to the current location information and the location information of the inflection point, to determine an object image of the inflection point based on the obtained distance, a first reference distance, and a second reference distance, and to control the display device to display the object image of the inflection point on the surrounding image displayed on the display device according to the location information of the inflection point and the current location information,
wherein the controller is configured to change the second reference distance to a third reference distance when the controller concludes that there is a plurality of the inflection points within a preset distance according to the route information, and
wherein the first reference distance is longer than the second reference distance, and the third reference distance is longer than the second reference distance and shorter than the first reference distance.

15. The vehicle of claim 14,
wherein the controller is configured to change display information of the object image of the inflection point according to the obtained distance information, and
wherein the display information of the object image of the inflection point includes at least one of shape information and color information of the object image.

16. The vehicle of claim 15, wherein
when the controller concludes that the distance to the inflection point is greater than or equal to the first reference distance, the controller is configured to identify a direction of the destination according to the current location information, the destination information, and map information, and to control the display device to display an object image oriented from the current location to the direction of the destination on the surrounding image displayed on the display device,
when the controller concludes that the distance to the inflection point is less than the first reference distance and greater than or equal to the second reference distance, the controller is configured to determine the object image of the inflection point as an object image of a long-distance inflection point, and when the controller concludes that the distance to the inflection point is less than the second reference distance, the controller is configured to determine the object image of the inflection point as an object image of a short-distance inflection point.

17. The vehicle of claim 16,
wherein the controller is configured to control the display device to display traffic information when the controller concludes that a display position of the oriented object image coincides with a display position of the object image of the short-distance inflection point and does not coincide with a display position of the object image of the long-distance inflection point, and
wherein the controller is configured to control the display device to display the traffic information and alternative route information when the controller concludes that the display position of the oriented object image does not coincide with the display position of the object image of the short-distance inflection point and does not coincide with the display position of the object image of the long-distance inflection point.

18. The vehicle of claim 14,
wherein when traffic information is received by the controller, the controller is configured to determine whether a route change is necessary based on the received traffic information, the destination information, the current location information, the route information, and map information, and to recognize a point at which the route is changed as an inflection point when the controller concludes that the route change is necessary.

19. The vehicle of claim 14, wherein the controller is configured to:
   determine whether a distance to the destination is less than or equal to a predetermined distance according to the destination information, the current location information, the route information, the driving speed information, and map information,
   recognize a destination image corresponding to the destination information from the surrounding image when the controller concludes that the distance to the destination is less than or equal to the predetermined distance, and
   control the display device to overlap and display an emphasized object image on the recognized destination image.

20. The vehicle of claim 14, wherein
when searching for the route from the current location to the destination, the controller is configured to search for the route from the current location to the destination according to the current location information, the destination information and map information obtained by the location receiver, and
when controlling the display device to display the object image of the inflection point on the surrounding image displayed on the display device, the controller is configured to control the display device to display the object image of the inflection point on the surrounding image displayed on the display device according to the location information of the inflection point, the map information, and the current location information.

* * * * *